(12) United States Patent
Kang et al.

(10) Patent No.: US 9,160,998 B2
(45) Date of Patent: Oct. 13, 2015

(54) METHOD AND APPARATUS FOR CANCELING CHROMATIC ABERRATION

(75) Inventors: Moon-gi Kang, Seoul (KR); Joon-young Chang, Seoul (KR); Jong-hyun Park, Seoul (KR); Hee Kang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 355 days.

(21) Appl. No.: 13/542,096

(22) Filed: Jul. 5, 2012

(65) Prior Publication Data
US 2012/0281122 A1 Nov. 8, 2012

Related U.S. Application Data

(62) Division of application No. 12/614,031, filed on Nov. 6, 2009, now Pat. No. 8,237,823.

(30) Foreign Application Priority Data

Nov. 6, 2008 (KR) .................. 10-2008-0110022
Nov. 6, 2008 (KR) .................. 10-2008-0110023

(51) Int. Cl.
*H04N 9/64* (2006.01)
*H04N 9/04* (2006.01)

(52) U.S. Cl.
CPC .............. *H04N 9/646* (2013.01); *H04N 9/045* (2013.01)

(58) Field of Classification Search
CPC .......... H04N 9/045; H04N 9/646; H04N 1/58
USPC .............. 348/242, 241, 223.1, 498; 382/162, 382/167, 275
See application file for complete search history.

(56) References Cited

U.S. PATENT DOCUMENTS

| 7,194,129 B1 * | 3/2007 | Reinhart ........................ 382/167 |
| 7,227,574 B2 | 6/2007 | Yamanaka |
| 7,916,937 B2 | 3/2011 | Utsugi et al. |

(Continued)

FOREIGN PATENT DOCUMENTS

| JP | 2008-227749 A | 9/2008 |
| KR | 10-2004-0024471 A | 3/2004 |

(Continued)

OTHER PUBLICATIONS

Boult et al., "Correcting Chromatic Aberrations Using Image Warping," 1992 IEEE Computer Society Conference on Computer Vision and Pattern Recognition, Proceedings CVPR'92, pp. 684-687 (1992).

(Continued)

*Primary Examiner* — Aung S Moe
(74) *Attorney, Agent, or Firm* — Drinker Biddle & Reath LLP

(57) ABSTRACT

Provided are a method and apparatus for canceling chromatic aberration. In the method, only chrominance signals are filtered using an asymmetrical mask according to the characteristics of chromatic aberration occurring from among a luminance/chrominance coordinates system. Accordingly, it is possible to cancel chromatic aberration regardless of the characteristics of a lens and prevent the resolution of the original image from degrading.

17 Claims, 15 Drawing Sheets

(56) References Cited

U.S. PATENT DOCUMENTS

| | | |
|---|---|---|
| 8,089,529 B2 | 1/2012 | Kawasaki |
| 8,237,823 B2 * | 8/2012 | Kang et al. .................... 348/242 |
| 8,805,070 B2 * | 8/2014 | Komatsu et al. ............. 382/167 |
| 2003/0086018 A1 * | 5/2003 | Berman et al. ................ 348/584 |
| 2004/0165081 A1 * | 8/2004 | Shibaki et al. ............. 348/222.1 |
| 2006/0188018 A1 * | 8/2006 | Lin .......................... 375/240.16 |
| 2007/0035641 A1 | 2/2007 | Yamada et al. |
| 2007/0103564 A1 * | 5/2007 | Chiba ........................ 348/223.1 |
| 2007/0103744 A1 * | 5/2007 | Chiba ........................... 358/518 |
| 2007/0116375 A1 * | 5/2007 | Utsugi et al. ................. 382/264 |
| 2008/0298678 A1 | 12/2008 | Kang |
| 2009/0052769 A1 | 2/2009 | Kang et al. |
| 2009/0153696 A1 | 6/2009 | Suwabe et al. |
| 2009/0185622 A1 | 7/2009 | Itoh et al. |
| 2009/0190855 A1 | 7/2009 | Kasahara |
| 2009/0238455 A1 | 9/2009 | Kasahara |
| 2010/0177962 A1 | 7/2010 | Kalman |
| 2010/0201828 A1 * | 8/2010 | Mitsuya et al. ............ 348/208.6 |
| 2010/0208104 A1 * | 8/2010 | Imagawa et al. ............. 348/234 |
| 2013/0271664 A1 * | 10/2013 | Mathew et al. ............... 348/607 |

FOREIGN PATENT DOCUMENTS

| | | |
|---|---|---|
| KR | 10-2006-0101995 A | 9/2006 |
| KR | 10-0818479 B1 | 4/2008 |
| WO | WO 2005/101854 A1 | 10/2007 |

OTHER PUBLICATIONS

Kang, "Automatic Removal of Chromatic Aberration from a Single Image," IEEE Conf. on Computer Vision and Pattern Recognition, pp. 1-8 (Jun. 2007).

Kaufmann et al., "Elimination of Color Fringes in Digital Photographs Caused by Lateral Chromatic Aberration," CIPA 2005 XX International Symposium, Sep. 26-Oct. 1, 2005, Torino, Italy, pp. 1-6 (2005).

Office Action issued for KR 10-2008-0110022 (Sep. 24, 2014).

Notice of Allowance issued for KR 10-2008-0110022 (Mar. 28, 2015).

Notice of Allowance issued for KR 10-2008-0110023 (Feb. 17, 2015).

\* cited by examiner

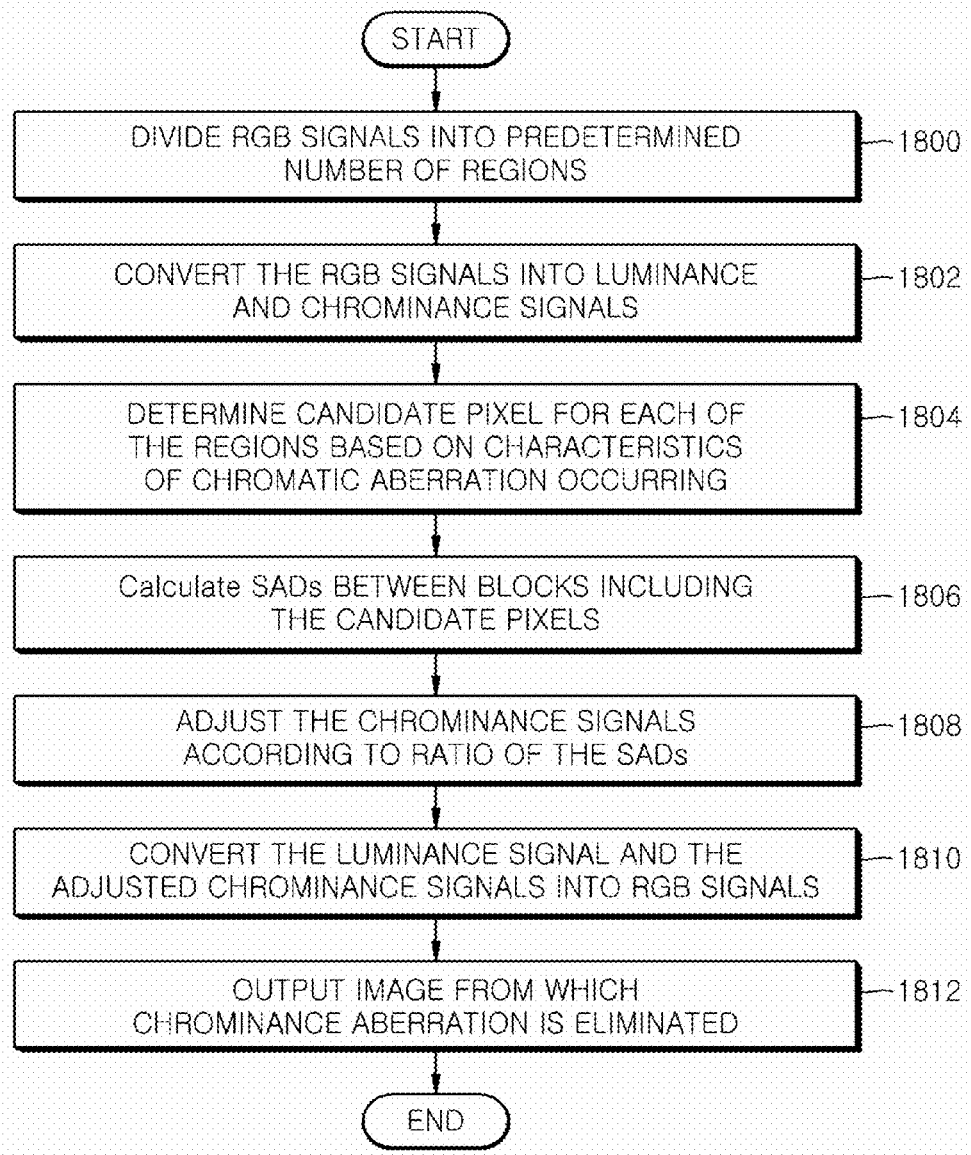

METHOD AND APPARATUS FOR CANCELING CHROMATIC ABERRATION

CROSS-REFERENCE TO RELATED PATENT APPLICATION

This application is a divisional application of U.S. patent application Ser. No. 12/614,031, filed Nov. 6, 2009, which claims the benefit of Korean Patent Application No. 10-2008-0110022, filed on Nov. 6, 2008, and Korean Patent Application No. 10-2008-0110023, filed on Nov. 6, 2008, in the Korean Intellectual Property Office, all of these disclosures being incorporated herein in their entirety by reference.

BACKGROUND

The present invention relates to image processing, and more particularly, to a method and apparatus for canceling chrominance aberration.

Chromatic Aberration (CA) is an aberration caused by a difference in refractive index according to different wavelengths of light. In an ideal lens, white light that is incident on the lens should pass through the lens and then be focused on one point on an image plane. However, in an actual lens, light having relatively short wavelength is refracted more than light having relatively long wavelength and thus a focus varies according to the wavelengths of lights due to the difference in refractive index according to the different wavelengths. That is, a focus varies according to colors of light. A color image is formed of three colors, i.e., red (R), green (G), and blue (B). As described above, in general, light of R.G.B focuses on different spots due to an effect of the lens and thus, false colors are generated in the image. This is referred to as "chromatic aberration".

Chromatic aberration may be mainly classified into longitudinal chromatic aberration and lateral chromatic aberration. Longitudinal chromatic aberration is caused due to a focus difference on an optical axis, and lateral chromatic aberration is caused due to a difference in magnification according to color. Longitudinal chromatic aberration and lateral chromatic aberration are not generated separately and instead, are generated together.

Chromatic aberration may be observed in most optical devices using a lens. In manufacturing of the lens used in the optical devices, various lenses are combined to correct the chromatic aberration. However, even if the lenses are combined, chromatic aberration cannot be completely cancelled. Also, in most cameras installed in mobile phones and typical compact cameras, inexpensive lenses are used and thus, chromatic aberration may be more conspicuous. Moreover, although resolutions of cameras installed in mobile phones and digital cameras are rapidly increasing, lens quality does not proportionally increase due to cost and size of the lenses. That is, chromatic aberration is generated mostly in cameras, and manufacturers of the cameras are trying to reduce chromatic aberration.

A conventional method of canceling chromatic aberration includes matching sizes of three channels, R, G, and B, in order to correct chromatic aberration occurring due to lateral chromatic aberration. In order to match the sizes of the three channels, an interpolation process is required, in which displacement in each channel is predicted, a proportion of a size of an image is obtained through predicted information, and the sizes of two channels are matched to the size of the remaining single channel. Here, scaling parameters of the R, G, and B channels are calculated according to a registration algorithm, the registration algorithm using a black and white image having a specific pattern. That is, corner points having the specific pattern are extracted and matched for each channel and then, scaling information is identified using the corner points.

In the conventional method, lateral chromatic aberration can be efficiently cancelled as the sizes of the images are matched by predicting displacement of the channels. However, if the conventional method is used, registration information must be previously predicted for each lens through the specific pattern and then, the chromatic aberration is cancelled using the parameters (that is, registration information must be known for all lenses in advance), and extracting the parameters and canceling chromatic aberration are separated since the registration algorithm must be performed independently by using the image having the specific pattern. In addition, the conventional method is not effective in DSLR cameras in which lenses are changed. Furthermore, DSLR cameras have limitations in correcting chromatic aberration caused by longitudinal chromatic aberration and lateral chromatic aberration together since longitudinal chromatic aberration is not considered in DSLR cameras.

An analysis of an image that undergoes chromatic aberration reveals that there is directionality in chromatic aberration occurring according to the location of the image, particularly, due to lateral chromatic aberration. That is, the directionality of chromatic aberration in a current pixel that is to be processed may be determined on a block-by-block basis of the image. Thus, it is possible to effectively cancel chromatic aberration by performing filtering a region of the image, which is asymmetrical with respect to a direction in which chromatic aberration occurs.

Also, when chromatic aberration occurs in a location in an image, on which strong light is incident, the size of the location increases. However, in order to perform a technique of canceling such chromatic aberration in a hardware manner, there is a limit to the number of line memories that can be used, and particularly, to canceling chromatic aberration occurring in the vertical direction. Thus, when the total number of line memories that can be used is insufficient to cancel chromatic aberration occurring in the vertical direction, chromatic aberration is difficult to cancel. Accordingly, in order to solve this problem, there is a need for development of a method of efficiently canceling chrominance aberration by using a given number of line memories.

Also, in general, an image is focused around the focus of yellow light. That is, the location of an image plane focused when light is incident on and passes through the lens is present between the focuses of signals from G and R channels. In this case, since a signal from a B channel is focused far from the image plane, an image from the B channel is more blurred than those from the R and G channels, and thus, blue chromatic aberration is more visible in the image from the B channel than in images from the R and G channels. Accordingly, there is a need to effectively cancel chromatic aberration in the B channel.

SUMMARY

Various embodiments of the present invention provide a method and apparatus for canceling chromatic aberration by using an input image only without advance information of each lens, and for canceling chromatic aberration regardless of lens characteristics by filtering a chrominance signal only by using an asymmetrical mask and according to the characteristics of chromatic aberration occurring.

Various embodiments of the present invention also provide a method of controlling a predetermined number of line memories, which are used to generate a chrominance signal for correcting chromatic aberration, by aligning the line memories according to the characteristics of chromatic aberration occurring, so that the predetermined number of line memories can be effectively used.

According to an aspect of the present invention, there is provided a method of canceling chromatic aberration, the method including receiving RGB signals which are divided into a predetermined number of regions and luminance and chrominance signals which are converted from the RGB signals, and calculating RGB gradients and a luminance/chrominance difference by changing the filtering range of a mask to be applied to the respective regions; and generating a chrominance signal for correcting chromatic aberration by filtering the chrominance signals while reflecting the RGB gradients and the luminance/chrominance difference.

The luminance and chrominance signals may include luminance and chrominance signals of a color space coordinates system including at least one of YUV, YCbCr, Lab and YCC.

The filtering range of the asymmetrical mask may be differently determined for the regions of the RGB signals according to directionality of chromatic aberration.

The method may further include determining the degree of chromatic aberration using the luminance signal; and combining the chrominance signal for correcting chromatic aberration with the received chrominance signals based on the degree of chromatic aberration.

The RGB gradients and the luminance/chrominance difference may be calculated in the horizontal and vertical directions, and the received chrominance signals are filtered using the RGB gradients and the luminance/chrominance difference, which are calculated in the horizontal direction, and are filtered using the RGB gradients and the luminance/chrominance difference, which are calculated in the vertical direction.

The method may further include selecting one of chrominance signals obtained by filtering the received chrominance signals in the horizontal and vertical directions as a chrominance signal for correcting chromatic aberration.

A chrominance signal having smaller intensity may be selected from the chrominance signals obtained by filtering the received chrominance signals in the horizontal and vertical directions.

The determining of the degree of chromatic aberration may include detecting minimum and maximum values of the luminance signal in the horizontal and vertical directions; and selecting and outputting RGB values corresponding to a larger minimum value and maximum value from among the detected minimum and maximum values by using the RGB signals.

The combining of the chrominance signal for correcting chromatic aberration with the received chrominance signals may include generating a weight by using the RGB values corresponding to the output minimum value and maximum value; and combining the chrominance signal for correcting chromatic aberration with the received chrominance signals according to the weight.

The method may further include adjusting the received luminance signal according to the received chrominance signals; and converting the adjusted luminance signal and the result of combining the chrominance signal for correcting chromatic aberration with the received chrominance signals into final RGB signals.

The receiving of the RGB signals and the luminance and chrominance signals and the calculating of the RGB gradients and the luminance/chrominance difference may include calculating the differences between colors of an R signal and a G signal and between a B signal and the G signal by using the RGB signals. The generating of the chrominance signal for correcting chromatic aberration may include filtering the received chrominance signals by reflecting a larger value from among a gradient of the R signal and the difference between the colors of the R signal and the G signal and a larger value from among a gradient of the B signal and the difference between the colors of the B signal and the G signal.

According to another aspect of the present invention, there is provided a method of generating a chrominance signal for correcting chromatic aberration, wherein a chrominance signal for correcting chromatic aberration in a current pixel is calculated by assigning a weight to values of chrominance signals of pixels adjacent to the current pixel and averaging the resultant values from among luminance and chrominance signals converted from RGB signals that are divided into a predetermined number of regions. The weight is calculated using RGB gradients of the adjacent pixels, the differences between colors of the adjacent pixels, and the differences between luminance/chrominance of the current pixel and the adjacent pixels. The range of the adjacent pixels is differently determined for the regions of the RGB signals according to directionality of chromatic aberration.

According to another aspect of the present invention, there is provided a method of canceling chromatic aberration, the method including receiving RGB signals divided into a predetermined number of regions, and luminance and chrominance signals converted from the RGB signals; matching a block including a candidate pixel with a block including a current pixel that is to be processed, for each of the regions of the RGB signals; and adjusting the chrominance signals based on the result of matching.

The luminance and chrominance signals may include luminance and chrominance signals of a color space coordinates system including one of YUV, YCbCr, Lab and YCC.

The performing of block matching may include determining different candidate pixels for the regions based on characteristics of chromatic aberration occurring; and calculating sums of absolute distance (SADs) between B signals of blocks including the determined candidate pixels and G signals of blocks including the corresponding current pixels. The adjusting of the chrominance signals may include adjusting a U signal from among the chrominance signals according to at a ratio of the calculated SADs.

The calculating of the SADs may include calculating a first SAD between a B signal of a block including a first candidate pixel and a G signal of the block including the corresponding current pixel; and calculating a second SAD between a B signal of a block including a second candidate pixel and the G signal of the block including the corresponding current pixel, where the adjusting of the chrominance signals may include adjusting the U signal according to a ratio of the first SAD to the second SAD.

The first candidate pixel may be a current pixel that is to be processed.

The method may further include converting the adjusted U signal and the luminance and chrominance signals into final RGB signals.

The method may further include calculating a third SAD between the B signal of the block including the second candidate pixel and a B signal of the block including the corresponding current pixel. The U signal may be adjusted based on the adjusted U signal and the first through third SADs.

The U signal may be a chrominance signal for correcting chromatic aberration, which is obtained by receiving the RGB signals and the luminance and chrominance signals and filtering the chrominance signals while reflecting RGB gradients and luminance/chrominance differences calculated by changing the filtering range of an asymmetrical mask to be applied to the regions of the RGB signals.

The U signal may be the result of combining the chrominance signal for correcting chromatic aberration with the received chrominance signals according to a weight determined based on the degree of chromatic aberration occurring.

According to another aspect of the present invention, there is provided a method of controlling line memories for generating a chrominance signal for correcting chromatic aberration, wherein a predetermined number of line memories are aligned according to directionality of chromatic aberration occurring, and an average of values of pixel at lines above a current pixel that is to be processed is stored in the line memories when an upper part of an input image is to be processed and an average of values of pixels at lines below the current pixel is stored in the line memories when a lower part of the input image is to be processed.

According to another aspect of the present invention, there is provided an apparatus for canceling chromatic aberration, the apparatus including an RGB gradient calculation unit receiving RGB signals divided into a predetermined number of regions, and calculating RGB gradients by changing the filtering range of an asymmetrical mask; a luminance/chrominance difference calculation unit receiving luminance and chrominance signals converted from the RGB signals, and calculating a luminance/chrominance difference by using the asymmetrical mask; and a chrominance signal filtering unit generating a chrominance signal for correcting chromatic aberration by filtering the chrominance signals by reflecting the calculated RGB gradients and luminance/chrominance difference.

The luminance and chrominance signals may include luminance and chrominance signals of a color space coordinates system including at least one of YUV, YCbCr, Lab and YCC.

The filtering range of the asymmetrical mask is differently determined according to directionality of chromatic aberration occurring.

The apparatus may further include a chromatic aberration degree determination unit determining the degree of chromatic aberration by using the luminance signal; and a chrominance signal combining unit combining the chrominance signal for correcting chromatic aberration with the received chrominance signals according to the degree of chromatic aberration.

The RGB gradient calculation unit may include a horizontal-direction RGB gradient calculation unit calculating RGB gradients in the horizontal direction; and a vertical-direction RGB gradient calculation unit calculating RGB gradients in the vertical direction. The luminance/chrominance difference calculation unit may include a horizontal-direction luminance/chrominance difference calculation unit calculating a luminance/chrominance difference in the horizontal direction; and a vertical-direction luminance/chrominance difference calculation unit calculating a luminance/chrominance difference in the vertical direction. The chrominance signal filtering unit may include a horizontal-direction chrominance signal filtering unit filtering the received chrominance signals in the horizontal direction by using the RGB gradients and luminance/chrominance difference calculated in the horizontal direction; and a vertical-direction chrominance signal filtering unit filtering the received chrominance signals in the vertical direction by using the RGB gradients and luminance/chrominance difference calculated in the vertical direction.

The apparatus may further include a chrominance signal selection unit that selects one the of chrominance signals for correcting chromatic aberration, which are obtained by filtering the received chrominance signals in the horizontal and vertical directions.

The chrominance signal selection unit may select a signal having smaller intensity from among chrominance signals for correcting chromatic aberration, which are obtained by filtering the received chrominance signals in the horizontal and vertical directions.

The chromatic aberration degree determination unit may include a horizontal-direction minimum/maximum value detection unit detecting a minimum value and a maximum value of the received luminance signal in the horizontal direction; a horizontal-direction minimum/maximum value detection unit detecting a minimum value and a maximum value of the received luminance signal in the vertical direction; and an RGB selection outputting unit selecting and outputting RGB values corresponding to a larger minimum and maximum value from among the detected maximum and minimum values, by using the RGB signals.

The chrominance signal combining unit may include a weight generation unit generating a weight by using the output RGB values; and a combining unit combining the received chrominance signals with the chrominance signal for correcting chromatic aberration according to the weight.

The apparatus may further include a luminance signal adjustment unit adjusting the received luminance signal by using the received chrominance signals; and an RGB conversion unit converting the luminance signal received from the luminance signal adjustment unit and the chrominance signal received from the chrominance signal combining unit into RGB signals.

According to another aspect of the present invention, there is provided an apparatus for canceling chromatic aberration, the apparatus including a luminance/chrominance conversion unit receiving RGB signals divided into a predetermined number of regions and converting the RGB signals into luminance and chrominance signals; and a block matching unit matching blocks including candidate pixels of the regions with blocks including current pixels that are to be processed, and adjusting the chrominance signals based on the result of matching.

The luminance and chrominance conversion unit may convert the RGB signals into luminance and chrominance signals of a color space coordinates system including at least one of YUV, YCbCr, Lab and YCC.

The block matching unit may include a candidate pixel determination unit determining different candidate pixels for the regions of the RGB signals based on the degree of chromatic aberration occurring; an SAD calculation unit calculating SADs between B signals of blocks including the candidate pixels and G signals of blocks including the corresponding current pixels; and a chrominance signal adjustment unit adjusting a U signal from among the chrominance signals according to at a ratio of the calculated SADs.

The SAD calculation may calculate a first SAD between a B signal of a block including a first candidate pixel and a G signal of the block including the corresponding current pixel, and a second SAD between a B signal of a block including a second candidate pixel and the G signal of the block including the corresponding current pixel. The chrominance signal adjustment unit may adjust the U signal according to a ratio of the first SAD to the second SAD.

The first candidate pixel may be a pixel that is currently processed.

The apparatus may further include an RGB conversion unit converting the adjusted U signal and the luminance and chrominance signals into final RGB signals.

The SAD calculation unit may calculate a third SAD between the B signal of the block including the second candidate pixel and a B signal of the block including the corresponding current pixel. The chrominance signal adjustment unit may adjust the U signal based on the adjusted U signal and the first through third SADs.

The apparatus may further include a chrominance signal generation unit receiving the RGB signals and the luminance and chrominance signals, and generating a U signal by filtering the chrominance signals while reflecting RGB gradients and luminance/chrominance differences calculated by changing the filtering range of an asymmetrical mask to the regions of the RGB signals, where the U signal may be a chrominance signal for correcting chromatic aberration. The U signal may be the result of combining the chrominance signal for correcting chromatic aberration with the received chrominance signals according to a weight determined based on the degree of chromatic aberration occurring.

The filtering range of the asymmetrical mask may be determined according to directionality of chromatic aberration occurring.

According to another aspect of the present invention, there is provided a computer readable recording medium having recorded thereon a computer program for executing the above methods.

BRIEF DESCRIPTION OF THE DRAWINGS

The above and other features and advantages of the present invention will become more apparent by describing in detail exemplary embodiments thereof with reference to the attached drawings illustrating various embodiments in which:

FIG. 18 is a flowchart illustrating a method of canceling chromatic aberration, according to another embodiment of the present invention.

DETAILED DESCRIPTION OF THE EMBODIMENTS

Hereinafter, exemplary embodiments of the present invention will be described more fully with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Also, the terms used herein are defined according to the functions of the present invention. Thus, the terms may vary depending on users or operators and usages. That is, the terms used herein must be understood based on the descriptions made herein.

Figure 1:
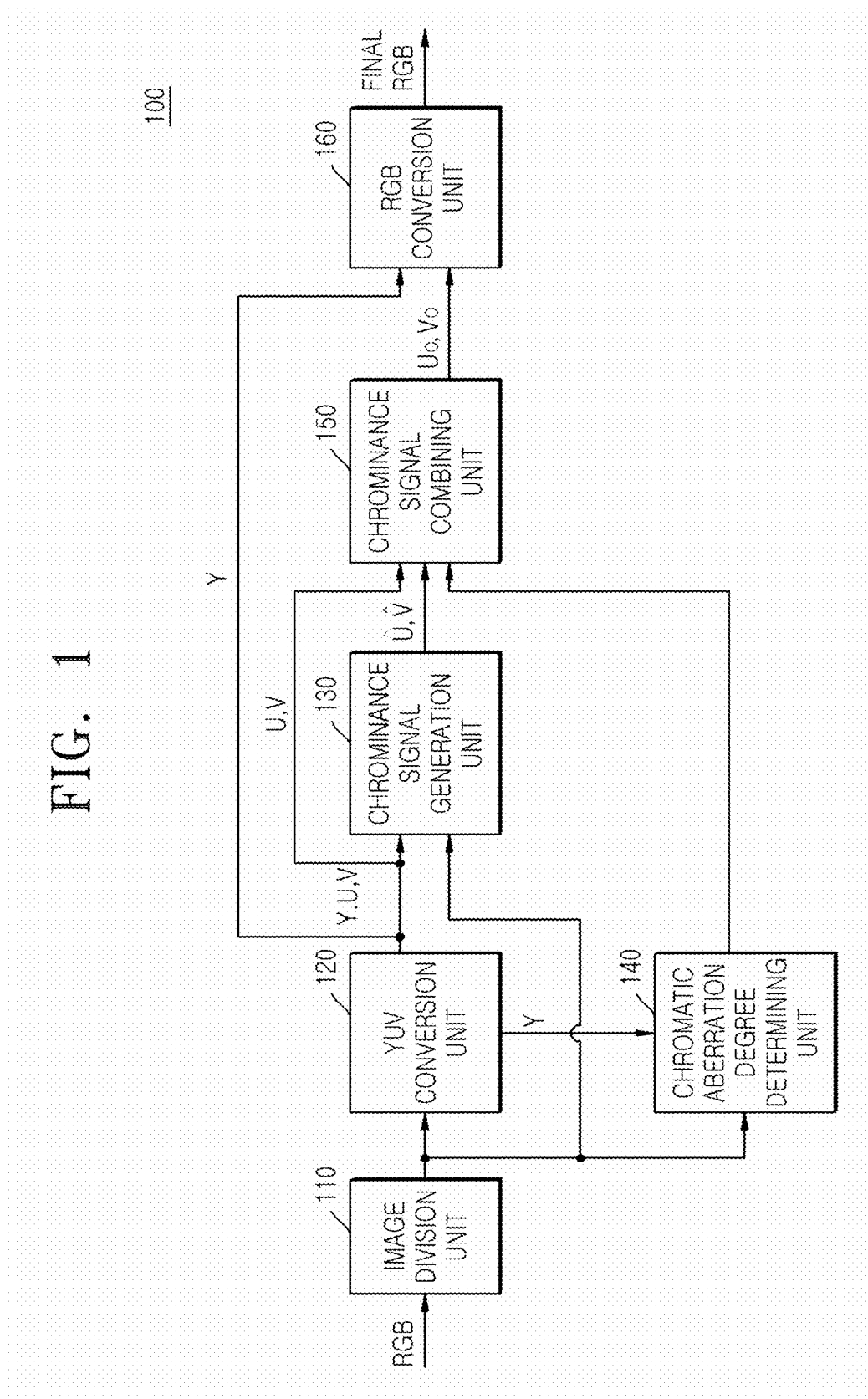
FIG. 1 is a schematic block diagram of an apparatus for canceling chromatic aberration, according to an embodiment of the present invention.

FIG. 1 is a schematic block diagram of an apparatus 100 for canceling chromatic aberration, according to an embodiment of the present invention. Referring to FIG. 1, the apparatus 100 includes an image division unit 110, a YUV conversion unit 120, a chrominance signal generation unit 130, a chromatic aberration degree determining unit 140, a chrominance signal combining unit 150 and an RGB conversion unit 160.

The image division unit 110 divides a received RGB image into a predetermined number of regions, so that filtering may be performed on the regions by changing the filtering range of a mask for correcting chromatic aberration, which is to be applied to the respective regions, in consideration of the directionality of chromatic aberration occurring in the regions. The received RGB image may be divided into four quadrants, and the filtering ranges of the asymmetrical mask to be applied to the respective quadrants are different from one another. A process of dividing an image and an asymmetrical mask will later be described with reference to FIGS. 4 and 5. The received RGB image is divided into several regions and image processing is performed on the regions in the current embodiment but may not be directly divided and instead, may be divided when the chrominance signal generation unit 130 performs filtering thereon in order to correct for a chrominance signal.

The YUV conversion unit 120 receives RGB signals and converts them into YUV signals. According to the current embodiment, the RGB signals are converted into YUV signals. However, such conversion may be also applied to YUV conversion coordinates, as well as other color space coordinates, for example, other luminance and chrominance coordinates such as YCrCb, Lab, and YCC.

The YUV conversion unit 120 converts the RGB signals into YUV signals, according to the equation as follows:

$$\begin{bmatrix} Y_i \\ U_i \\ V_i \end{bmatrix} = \begin{bmatrix} 0.299 & 0.587 & 0.114 \\ -0.169 & -0.331 & 0.5 \\ 0.5 & -0.419 & -0.082 \end{bmatrix} \cdot \begin{bmatrix} R_i \\ G_i \\ B_i \end{bmatrix}, \quad (1)$$

where $[R_i\ G_i\ B_i]^T$ denote R, G, and B values of an input image, where $R_i$, $G_i$, and $B_i$ respectively denote a red channel signal, a green channel signal, and a blue channel signal. $[Y_i\ U_i\ V_i]$ denote conversion values of the input R, G, and B into Y, U, and V, where $Y_i$ denotes a luminance signal and $U_i$ and $V_i$ denote chrominance signals.

The chrominance signal generation unit 130 receives the RGB signals, and receives luminance and chrominance signals (YUV signals) obtained by converting the RGB signals, from the YUV conversion unit 120. The chrominance signal generation unit 130 calculates an RGB gradient by using the RGB signals. In addition, the chrominance signal generation unit 130 calculates a luminance/chrominance difference by using the luminance and chrominance signals and filters the U and V signals by reflecting the calculated RGB gradient and luminance/chrominance difference, thereby generating the chrominance signals for correcting the chromatic aberration. In other words, the chromatic aberration is cancelled using all input RGB signals and the YUV signals, which are obtained by converting the RGB signals, in the current embodiment. Domains in which filtering is actually performed are the U and V domains, and the chromatic aberration is cancelled in the U and V domains by using a space adaptive weight designed using all of the input RGB signals and the YUV signals.

A method of canceling chromatic aberration according to an embodiment of the present invention is performed as in Equation (2) below.

$$U_o(i,j) = a_U(i,j) \cdot \{U_i(i,j) - \hat{U}(i,j)\} + \hat{U}(i,j)$$

$$V_o(i,j) = a_V(i,j) \cdot \{V_i(i,j) - \hat{V}(i,j)\} + \hat{V}(i,j) \quad (2),$$

wherein (i,j) denote vertical and horizontal coordinates of an image. $\hat{U}(i,j)$ and $\hat{V}(i,j)$ denote the chrominance signals for correcting the chromatic aberration, which respectively correspond to U and V signals. $a_U(i,j)$ and $a_V(i,j)$ are space adaptive weights for combining the input chrominance signals and the chrominance signal for correcting the chromatic aberration, and are determined by the degree of the chromatic aberration. Hereinafter, for convenience of an equation theorem, U and V are expressed in a variable C, which denotes the chrominance for the chrominance signal. Equation (2) may also be expressed using the variable C, as follows:

$$C_o(i,j) = a_C(i,j) \cdot \{C_i(i,j) - \hat{C}(i,j)\} + \hat{C}(i,j) \quad (3),$$

wherein C denotes U and V.

A principle of canceling chromatic aberration according to the current embodiment will now be described with reference to FIGS. 3A and 3B.

Figure 3A:
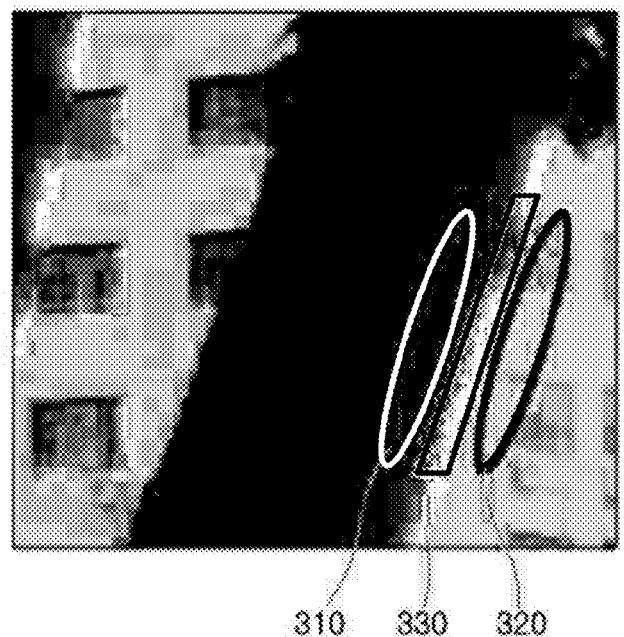
FIG. 3A is a photographic image, illustrating a situation in which chromatic aberration occurs.
Figure 3B:
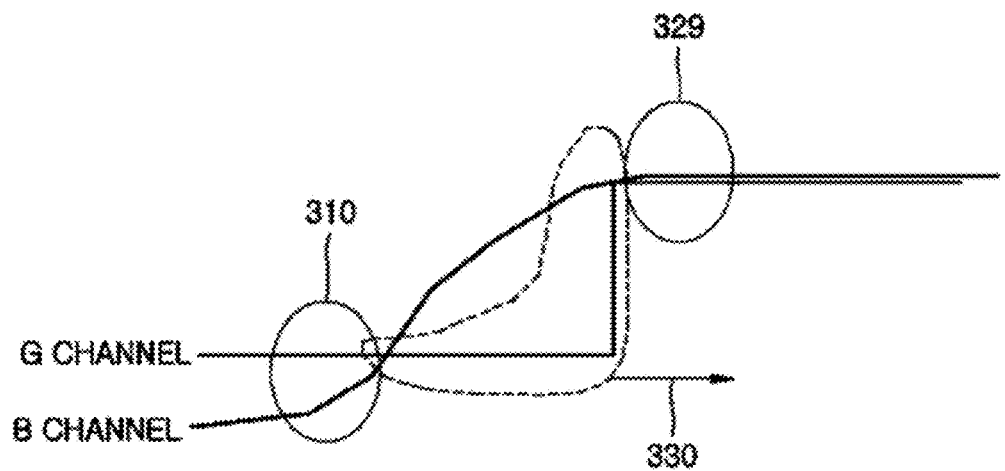
FIG. 3B is a graph from the region of an image, in which chromatic aberration occurs.

FIGS. 3A and 3B illustrate a region 330 of an image, in which chromatic aberration occurs. The principle of canceling chromatic aberration according to the current embodiment includes removing false colors from the region 330 by using chrominance signals of both portions 310 and 320 located to both sides of the region 330 in order to generate a chrominance signal for correcting the chromatic aberration.

Referring to FIG. 3B, gradients in each channel increase in the region 330. Thus, a false color is removed using the characteristics of the region 330. That is, since the region 330 has large gradients in each channel, the chromatic aberration is cancelled using the color of a region of each channel, which has a small gradient.

The chrominance signal generation unit 130 filters the chrominance signals by changing the filtering range of an asymmetrical mask to be applied to regions of the chrominance signals in order to generate the chrominance signal for correcting the chromatic aberration. Here, the chrominance signal for correcting the chromatic aberration is calculated by allocating a space adaptive weight to values on the asymmetrical mask. If the chrominance signal for correcting the chromatic aberration is generated using a general symmetrical mask in which a current pixel that is to be processed is located on the center of the mask, the chromatic aberration cannot be completely cancelled when the size of the region 330 is equal to that of the mask. If the size of the mask is increased, manufacturing costs increase, and thus, it is inefficient to realize the filtering as hardware. Thus, the chromatic aberration is efficiently cancelled by changing the filtering range of the asymmetrical mask to be applied to the respective regions of the chrominance signal, in consideration of a direction in which the chromatic aberration occurs.

The value of a chrominance signal for correcting chromatic aberration for a current pixel is calculated by assigning a predetermined weight to values of chrominance signals of pixels adjacent to the current pixel, and then averaging the resultant values. Here, the weight may be calculated from an RGB gradient and color difference, and a luminance/chrominance difference between the current pixel and the adjacent pixels.

Figure 4:
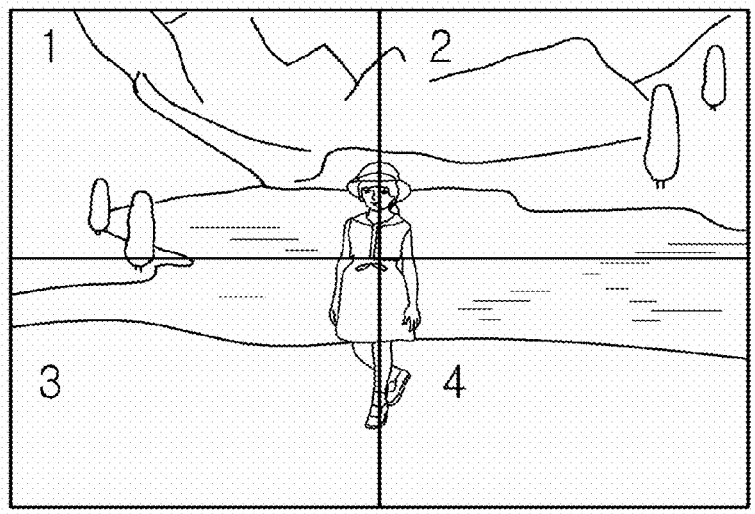
FIG. 4 is a pictorial illustration of an RGB image that is divided into four quadrants according to an embodiment of the present invention.

FIG. 4 illustrates a received RGB image that is divided into four quadrants according to an embodiment of the present invention. Referring to FIG. 4, the received RGB image is divided into first through fourth quadrants but the present invention is not limited thereto. For example, the received RGB image may be divided into more or less than four regions and these regions may be filtered by changing the filtering range of an asymmetrical mask, in consideration of the directionality and degree of chromatic aberration and the total number of line memories that can be used.

In general, due to lateral chromatic aberration, the farther a region of an image, which undergoes chromatic aberration, is from the center of the image, the greater the differences among the sizes of R, G, B channels are. Thus, chromatic aberration has directionality, in which a direction in which chromatic aberration occurs varies according to the location of the image. In the current embodiment, the filtering ranges of an asymmetrical mask to be applied to quadrants of an image are different from one another, so that chromatic aberration may be completely cancelled using only a given number of line memories.

Figure 5:
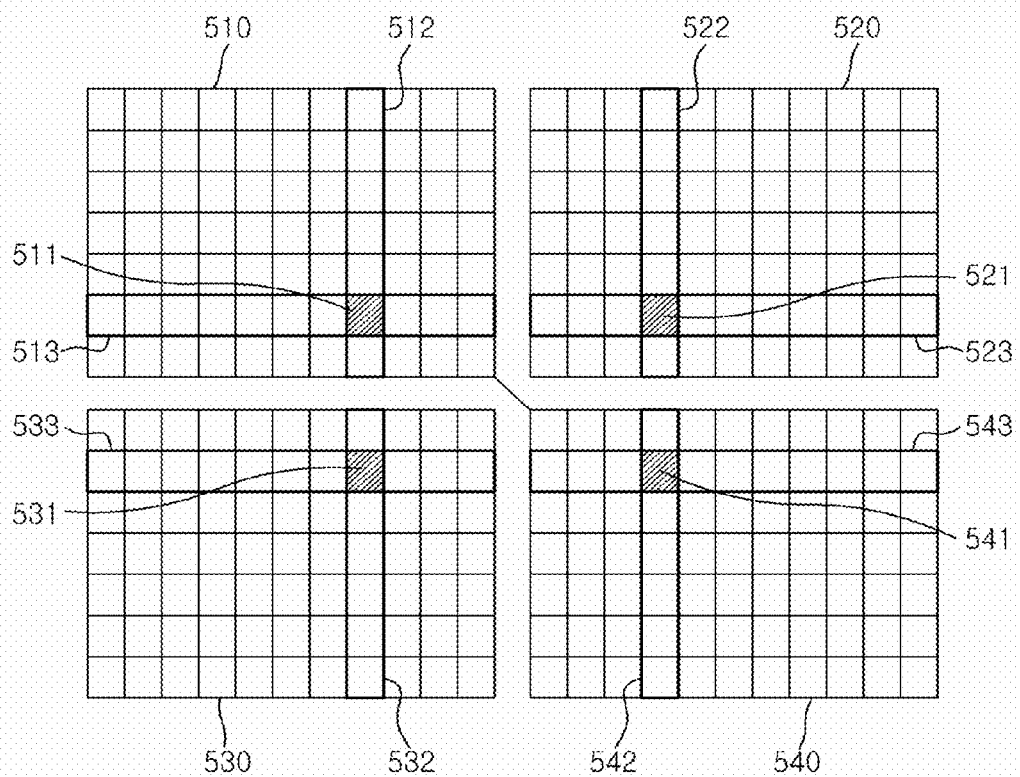
FIG. 5 is a pictorial diagram illustrating a method of respectively changing the filtering range of an asymmetrical mask to be applied to quadrants of an image such as shown in FIG. 4, according to an embodiment of the present invention.

FIG. 5 is a diagram illustrating a method of respectively changing the filtering range of an asymmetrical mask to be applied to first to fourth quadrants 510 to 540 of an image such as shown in FIG. 4, according to an embodiment of the present invention. Here, the size of the asymmetrical masks is 7×11 (vertical×horizontal) but may vary according to the degree of chromatic aberration and the size of each of given line memories. In the current embodiment, asymmetrical masks are used in order to efficiently process a region of an image, in which chromatic aberration occurs, thereby efficiently canceling the chromatic aberration.

Referring to FIG. 5, in the first quadrant 510, a first pixel 511 that is to be processed, and a first vertical mask 512 and a first horizontal mask 513 for generating a chrominance signal for canceling chromatic aberration in the first pixel 511 are illustrated. Here, the first vertical and horizontal masks 512 and 513 are 7×11 asymmetrical masks. In the second quadrant 520, a second pixel 521 that is to be processed, and a second vertical mask 522 and a second horizontal mask 523 for generating a chrominance signal for canceling chromatic aberration in the second pixel 521 are illustrated. Here, the second vertical and horizontal masks 522 and 523 are 7×11 asymmetrical masks. In the third quadrant 530, a third pixel 531 that is to be processed, and a third vertical mask 532 and a third horizontal mask 533 for generating a chrominance signal for canceling chromatic aberration in the third pixel 531 are illustrated. Here, the third vertical and horizontal masks 532 and 533 are 7×11 asymmetrical masks. In the fourth quadrant 540, a fourth pixel 541 that is to be processed, and a fourth vertical mask 542 and a fourth horizontal mask 543 for generating a chrominance signal for canceling chromatic aberration in the fourth pixel 541 are illustrated. Here, the fourth vertical and horizontal masks 542 and 543 are 7×11 asymmetrical masks. As described above, the filtering range of masks to be applied to respective regions of an image are determined to be different, since the farther a region of an image, which undergoes chromatic aberration, is from the center of the image, the greater the differences among the sizes of R, G, B channels are. In the current embodiment, the size of the asymmetrical masks is 7×11 but may vary according to the degree of chromatic aberration and the size of each of given line memories.

More specifically, the chrominance signals are filtered to generate a chrominance signal for correcting chromatic aberration. Preferably, the chrominance signals may be one-dimensionally filtered in the vertical and horizontal directions in order to reduce the amount of calculation, and a chrominance signal whose color is closer to an achromatic color is selected as a final chrominance signal for correcting chromatic aberration from among chrominance signals for correcting chromatic aberration which are obtained in the both directions.

A chrominance signal C may be filtered in the vertical and horizontal directions as expressed in Equation (4) below.

$$\hat{C}_h(i, j) = \frac{\sum_{l=-L_2}^{L_1} S_C(i, j+l) \cdot w_C(i, j+l) \cdot C_i(i, j+l)}{\sum_{l=-L_2}^{L_1} S_C(i, j+l) \cdot w_C(i, j+l)} \quad (4)$$

$$\hat{C}_v(i, j) = \frac{\sum_{m=-M_2}^{M_1} S_C(i+m, j) \cdot w_C(i+m, j) \cdot C_i(i+m, j)}{\sum_{m=-M_2}^{M_1} S_C(i+m, j) \cdot w_C(i+m, j)},$$

where (i,j) denote variables indicating the location of a current pixel that is being processed, l denotes a variable indicating the addresses of neighboring pixels adjacent to the current pixel in the horizontal direction, which are to be used in filtering, and m denotes a variable indicating the addresses of neighboring pixels adjacent to the current pixel in the vertical direction, which are to be used in filtering. l has a range of $-L_2 \leq l \leq L_1$ ($L_1$ and $L_2$ are positive numbers) and m has a range of $-M_2 \leq m \leq M_1$ ($M_1$ and $M_2$ are positive numbers). When 7×11 asymmetrical masks described above with reference to FIG. 5 are used, $L_1=3$, $L_2=7$, $M_1=1$, and $M_2=5$ in the case of the first quadrant 510, $L_1=7$, $L_2=3$, $M_1=1$, and $M_2=5$ in the case of the second quadrant 520, $L_1=3$, $L_2=7$, $M_1=5$, and $M_2=1$ in the case of the third quadrant 530, and $L_1=7$, $L_2=3$, $M_1=5$, and $M_2=1$ in the case of the fourth quadrant 540.

$\hat{C}_h(i,j)$ denotes a chrominance signal for correcting the chromatic aberration, which is obtained by filtering the chrominance signals in the horizontal direction. $\hat{C}_v(i,j)$ denotes a chrominance signal for correcting the chromatic aberration, which is obtained by filtering the chrominance signals in the vertical direction. According to Equation (4), the value of the chrominance signal $\hat{C}_h(i,j)$ is calculated by the weighted sum of the neighboring pixels in the horizontal direction. That is, the value of the chrominance signal $\hat{C}_h(i,j)$ is calculated by averaging values obtained by multiplying the weight of $S_C(i,j+l)*w_C(i,j+l)$ by values of neighboring pixels $C_i(i,j+l)$ in the horizontal direction. Likewise, the chrominance signal $\hat{C}_v(i,j)$ is calculated by the weighted sum of the neighboring pixels in the vertical direction. That is, the chrominance signal $\hat{C}_v(i,j)$ is calculated by averaging values obtained by multiplying the weight of $S_C(i+m, i)*w_C(i+m, j)$ by values of neighboring pixels $C_i(i+m,j)$ in the vertical direction. Here, $S_C(i,j+l)$ and $S_C(i+m, j)$ are switching functions that prevent adjacent pixels whose colors are different from the color of the current pixel from being considered during the above averaging operations. The switched functions $S_C(i,j+l)$ and $S_C(i+m, j)$ may be calculated as follows:

$$S_C(i, j+l) = \begin{cases} 1, & \text{if } \text{sign}\{C_i(i, j)\} = \text{sign}\{C_i(i, j+l)\} \\ & \text{or } |C_i(i, j)| < T \\ 0, & \text{otherwise} \end{cases} \quad (5)$$

$$S_C(i+m, j) = \begin{cases} 1, & \text{if } \text{sign}\{C_i(i, j)\} = \text{sign}\{C_i(i+m, j)\} \\ & \text{or } |C_i(i, j)| < T \\ 0, & \text{otherwise,} \end{cases}$$

where sign{x} is a function for determining a sign of x When a value of the neighboring $C_i(i,j+l)$ has the same sign as a value of a center pixel $C_i(i,j)$, sign{x} returns "1" to be used in filtering. In addition, when the neighboring pixel $C_i(i,j+l)$ has a color that is somewhat close to an achromatic color, for example, $|C_i(i,j)|<T$, sign{x} returns "1" to be used in filtering. In the current embodiment, T is used as a threshold value for determining the degree of closeness to an achromatic color and may be arbitrarily determined, for example, "10". Except for these two cases, it is considered that the color is remarkably different from the value of the center pixel, and thus, the switching function $S_C(i,j+l)$ returns "0" not to be used in filtering. That is, since the switching function $S_C(i,j+l)$ excludes portions having remarkably different color from filtering and thus, prevents the color of an input image from degrading. The operation of the switching function $S_C(i+m,j)$ which is used for filtering in the vertical direction, is similar to that of the switching function $S_C(i,j+l)$.

$w_C(i,j+l)$ and $w_C(i+m,j)$ are determined to have small values in the case of a pixel value in which chromatic aberration occurs so that $w_C(i,j+l)$ and $w_C(i+m,j)$ may be excluded from the weighted sum of the neighboring pixels. However, $w_C(i, j+l)$ and $w_C(i+m,j)$ are considered in order to prevent the color of an input image from being damaged. $w_C(i,j+l)$ and $w_C(i+m,j)$ may be calculated as follows:

$$w_C(i, j+l) = \begin{cases} \dfrac{1.0}{D_G(i, j+l) + D_B(i, j+l) + D_r(i, j+l)}, & \text{if } C = U \\ \dfrac{1.0}{D_G(i, j+l) + D_R(i, j+l) + D_r(i, j+l)}, & \text{if } C = V \end{cases} \quad (6)$$

$$w_C(i+m, j) = \begin{cases} \dfrac{1.0}{D_G(i+m, j) + D_B(i+m, j) + D_r(i+m, j)}, & \text{if } C = U \\ \dfrac{1.0}{D_G(i+m, j) + D_R(i+m, j) + D_r(i+m, j)}, & \text{if } C = V, \end{cases}$$

where "c" of $w_C(i,j+l)$ is a variable for determining whether a channel is a U or V channel. When "c" indicates the U or V channel, $w_C(i,j+l)$ may be determined as in Equation (6). Here, $D_G(i,j+l)$, $D_B(i,j+l)$, and $D_R(i,j+l)$ denote gradients of RGB signals for canceling chromatic aberration. $D_Y(i,j+l)$ denotes a luminance/chrominance difference for maintaining the color of the input image. As described above, a gradient of each channel increases in a region of an image in which chromatic aberration occurs. Thus, a chrominance signal of a region of the image where the gradient of each channel increases causes a false color to be generated, and thus, the value of the chrominance signal is excluded from the weighted sum of the neighboring pixels. The U channel is greatly affected by the G and B channels and thus, the gradients of the G and B channels are used. The V channel is greatly affected by the G and R channels and thus, the gradients of the G and R channels are used. Also, a color difference increases in the region of the image where chromatic aberration occurs, since a false color is generated therein. Thus, it is probable that chrominance aberration occurs in the region in which the color difference increases. Accordingly, this region is also excluded from the weighted sum of the neighboring pixels. The above description is also applied to $w_C(i+m,j)$. The operation of the chrominance signal generation unit 130, and $D_G(i,j+l)$, $D_B(i,j+l)$, $D_R(i,j+l)$, $D_Y(i,j+l)$ will be described later in greater detail with reference to FIGS. 6 and 7.

Figure 8:
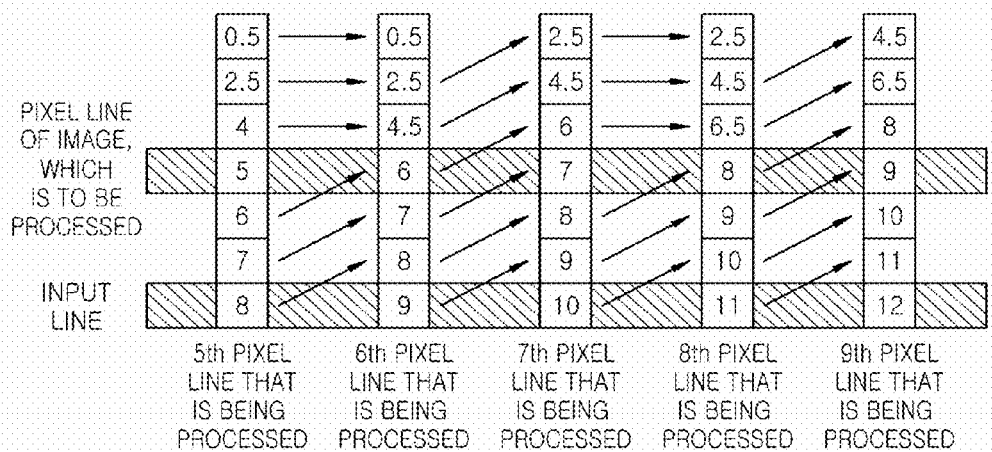
FIG. 8 is a block diagram illustrating a method of using a line memory for generating a chrominance signal for correcting chromatic aberration, according to an embodiment of the present invention.
Figure 9:
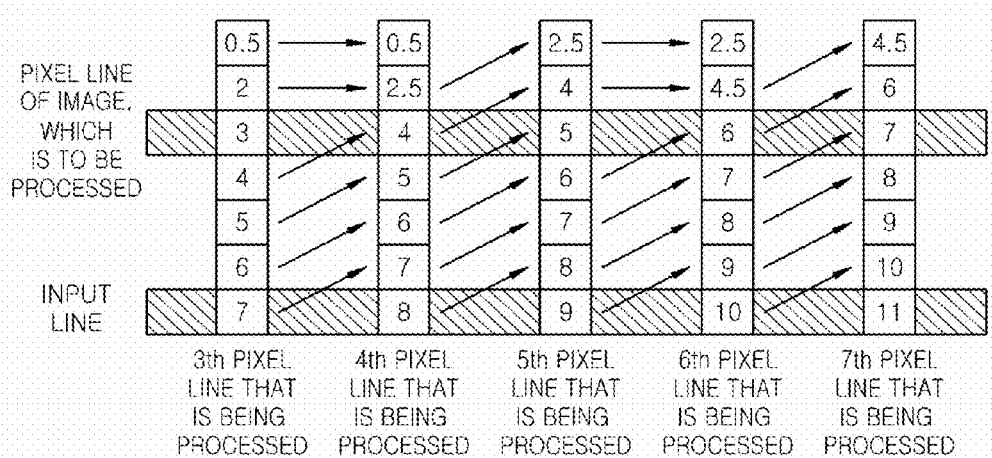
FIG. 9 is a diagram illustrating a method of using a line memory for generating a chrominance signal for correcting chromatic aberration, according to another embodiment of the present invention.

FIGS. 8 and 9 are diagrams illustrating embodiments of a method of using line memories for generating a chrominance signal for correcting chromatic aberration, according to the present invention.

One of problems with canceling chromatic aberration by using a space adaptive method, i.e., by performing filtering using asymmetrical masks, is that there is a limitation to the total number of line memories that can be used. The more line memories that can be used, the more efficiently chromatic aberration occurring in the vertical direction can be cancelled. However, in general, the total number of line memories that can be used depends on manufacturing costs and the size of hardware. In general, when the size of a region of an image where chromatic aberration occurs is greater than the total number of line memories, the chromatic aberration is difficult to cancel. Thus if more lines of the image can be processed with a given number of line memories, the performance of canceling chromatic aberration can be increased. Accordingly, an embodiment of the present invention provides a method of obtaining an effect when more than a given number of line memories are used, using the given number of lines memories.

FIG. 8 illustrates a method of using a line memory when an upper part of an image, e.g., the first and second quadrants 510 and 520 of FIG. 5, is filtered according to an embodiment of the present invention. When an upper part of an image that undergoes chromatic aberration is processed, the range of chromatic aberration in the upper part of a current pixel that is to be processed is greater than that in a lower part thereof, due to the chromatic aberration. Here, a seven-line memory is used.

Referring to FIG. 8, in order to process a pixel at a fifth line of an image, an average of pixel values at a $0^{th}$ line and a first line, i.e., 0.5, is stored in a first line memory, an average of pixel values at a second line and a third line, i.e., 2.5, is stored in a second line memory, and then pixel values at the other lines are respectively sequentially stored in the other lines of the memory. In this case, the pixel values at five lines, i.e., at the $0^{th}$ to fourth lines, of the upper part of the image can be processed using a three-line memory, and thus, pixel values at nine lines can be processed using a seven-line memory. Then, a pixel at a sixth line of the image may be processed by storing an average of pixel values at the fourth and fifth lines, i.e., 4.5, in the third line memory, and sequentially storing the pixel values at the other lines in the other lines of the memory. That is, pixel values at ten lines can be processed using the seven-line memory. Accordingly, it is possible to draw an effect obtained when more than a given number of line memories are used, using the given number of line memories.

FIG. 9 illustrates a method of using a line memory when a lower part of an image, e.g., the third and fourth quadrants 530 and 540 of FIG. 5, is filtered according to an embodiment of the present invention. When a lower part of an image that undergoes chromatic aberration is processed, the range of chromatic aberration in the lower part of a current pixel that is to be processed is greater than that in an upper part thereof, due to the chromatic aberration. Here, a seven-line memory is used.

The lower part of the image is processed as described above with reference to FIG. 8, except that a current pixel value that is to be processed is stored in an upper line of the seven-line memory rather than a center line thereof in order to respectively store more pixel values at lower lines in the other lower lines of the memory so that the pixel values at lower lines of the image may be used.

Referring to FIG. 9, in order to process a pixel at a third line of an image, an average of pixel values at a $0^{th}$ line and a first line, i.e., 0.5, is stored in a first line memory and then pixel values at the other lines are respectively sequentially stored in the other lines of the memory. In this case, the pixel values at eight lines of the image can be processed using a three-line memory, and thus, pixel values at nine lines can be processed using the seven-line memory. In order to process a pixel at a fourth line of the image, the average of the pixel values at the $0^{th}$ line and the first line, i.e., 0.5, is stored in the first line memory, an average of pixel values at a second line and a third line, i.e., 2.5, is stored in the second line memory, and then pixel values at the other lines are respectively sequentially stored in the other lines of the memory. In this case, since pixel values at four lines, i.e., the $0^{th}$ to third lines, of the image can be processed, pixel values at nine lines can be processed using the seven-line memory. Accordingly, even if the size of a region of an image where chromatic aberration is greater than that of a line memory, chromatic aberration may be effectively cancelled.

Although FIG. 1 illustrates that the an apparatus 100 for canceling chromatic aberration includes the image the division unit 110, the YUV conversion unit 120, the chrominance signal generation unit 130, the chromatic aberration degree determining unit 140, the chrominance signal combining unit 150 and the RGB conversion unit 160, the chrominance signal generation unit 130 should be used to cancel chromatic aberration. That is, a chrominance signal $\hat{C}(i, j)$ output from the chrominance signal generation unit 130 is used for canceling chromatic aberration, and chrominance aberration is cancelled from a final chrominance signal $C_O$ since a false color caused by chromatic aberration is removed by filtering other chrominance signals.

The chromatic aberration degree determining unit 140 and the chrominance signal combining unit 150 prevent the colors of the original image from being damaged while the chrominance signal generation unit 130 removes a false color.

The chromatic aberration degree determining unit 140 determines the degree of chromatic aberration by using a Y signal received from the YUV conversion unit 120. That is, the Y signal is used to measure the degree of chromatic aberration. As described above, a luminance component represents the brightness of an image, and chromatic aberration is more visible in a region having a large brightness difference. That is, the degree of chromatic aberration may be measured using contrast information of the Y signal. Thus, in order to measure the degree of chromatic aberration by using the contrast of the image, a location on a luminance signal, which has local minimum and maximum values, is detected in both the vertical and horizontal directions. The construction and operation of the chromatic aberration degree determining unit 130 will be described later with reference to FIG. 10.

The chrominance signal combining unit 150 combines information regarding the degree of chromatic aberration, which is received from the chromatic aberration degree determining unit 140, the chrominance signal $\hat{C}(i, j)$ received from the chrominance signal generation unit 130, and an input chrominance signal $C(i,j)$. Here, the information regarding the degree of chromatic aberration is calculated using a predetermined weight, and a ratio in which the chrominance signal $\hat{C}(i, j)$ and the input chrominance signal $C(i,j)$ are combined is determined according to the weight. The construction and operation of chrominance signal combining unit 150 will be described later with reference to FIG. 11.

In an embodiment of the present invention, the apparatus 100 for canceling chromatic aberration includes the RGB conversion unit 160 but the present invention is not limited thereto. For example, in general, compression or detail enhancement (DE) of an image is performed after converting RGB signals into luminance and chrominance coordinates. Corrected luminance and chrominance signals are output after the luminance and chrominance coordinates are used so that the output luminance and chrominance signals may be directly input to a compression module or a DE module and be processed.

In another embodiment of the present invention, the compression module or the DE module may be connected to the end of the apparatus 100. In another embodiment of the present invention, in the case of a digital photographing apparatus, for color adjustment, a white balance (WB) device or a color calibration device may be connected to the end of the apparatus 100. In another embodiment of the present invention, a noise cancelation device may be connected to the end of the apparatus 100 in order to cancel noise, and then chromatic aberration may be canceled.

Figure 2:
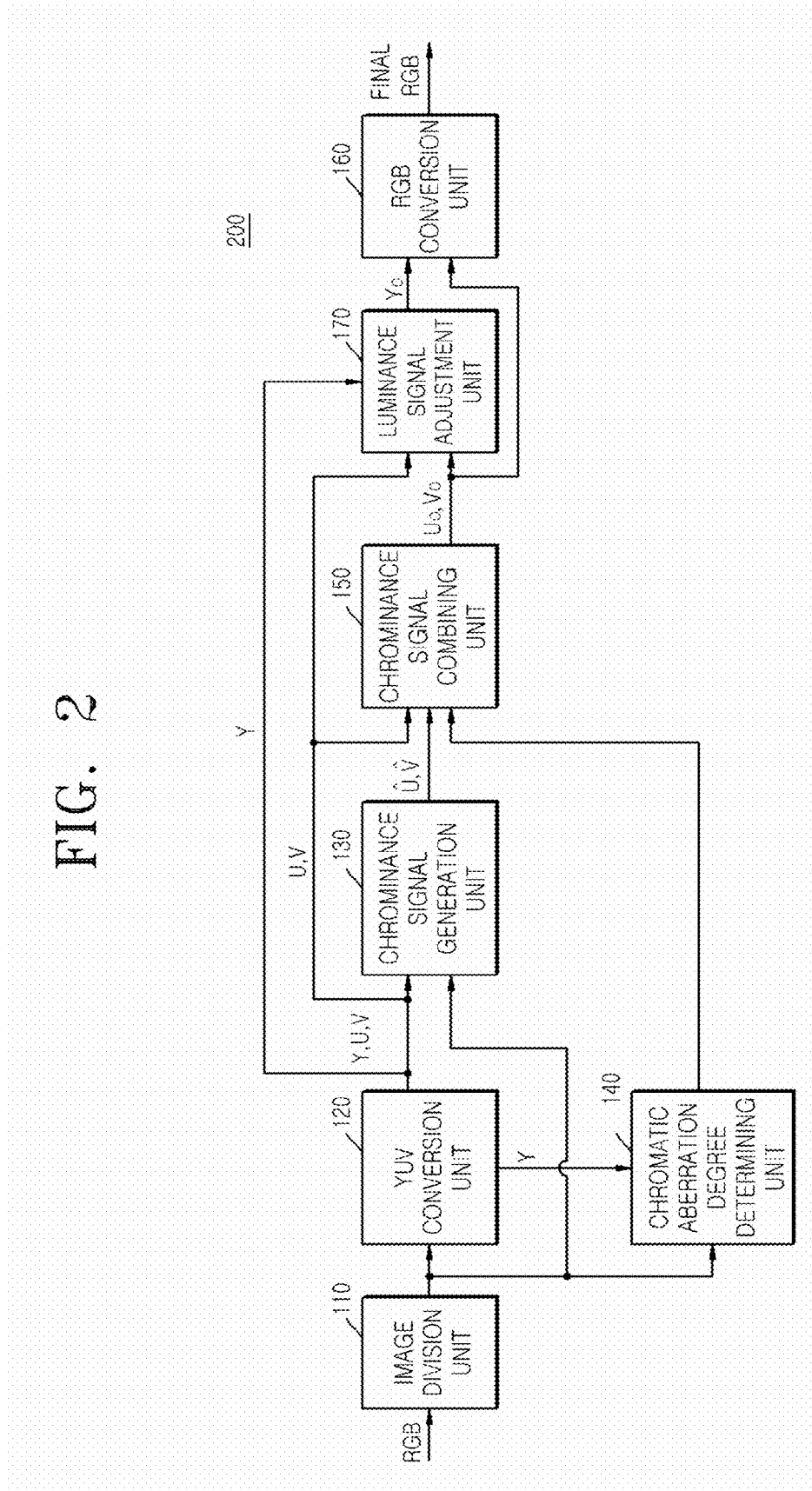
FIG. 2 is a schematic block diagram of an apparatus for canceling chromatic aberration, according to another embodiment of the present invention.

FIG. 2 is a schematic block diagram of an apparatus 200 for canceling chromatic aberration, according to another embodiment of the present invention. Referring to FIG. 2, the apparatus 200 includes an image division unit 110, a YUV conversion unit 120, a chrominance signal generation unit 130, a chromatic aberration degree determining unit 140, a chrominance signal combining unit 150, an RGB conversion unit 160 and a luminance signal adjustment unit 170.

The apparatus 200 further includes the luminance signal adjustment unit 170 compared to the apparatus 100 of FIG. 1. Thus, descriptions of constitutional elements that are also shown in FIG. 1 are not repeated, and the apparatus 200 of FIG. 2 will now be described focusing on the luminance signal adjustment unit 170.

The luminance signal adjustment unit 170 adjusts a received Y signal according to received $U_i$ and $V_i$ signals. In detail, the luminance signal adjustment unit 170 adjusts the Y signal by using final $U_O$ and $V_O$ signals received from the chrominance signal combining unit 150 and the $U_i$ and $V_i$ signals received from the YUV conversion unit 120 and according to the input $U_i$ and $V_i$ signals, and then outputs a adjusted $Y_o$ signal to the RGB conversion unit 160.

The Y signal adjusted is because it is also affected by false RGB values. Equation (7) below indicates RGB conversion for describing re-adjustment of the luminance signal.

$$\begin{bmatrix} R_o \\ G_o \\ B_o \end{bmatrix} = \begin{bmatrix} 1 & 0 & 1.4 \\ 1 & -0.345 & -0.714 \\ 1 & 1.77 & 0 \end{bmatrix} \begin{bmatrix} Y_o \\ U_o \\ V_o \end{bmatrix}, \quad (7)$$

In general, while capturing an image using a camera, the camera focuses on light in yellow close to green. Thus a G channel is in a well-focused state from among R, G, B channels. In an embodiment of the present invention, the Y signal is adjusted on an assumption that the G channel is in a well-focused state.

If chromatic aberration is seen in purple, the chromatic aberration may occur due to an excess of red (R) and blue (B). In this case, since the G channel is in a well-focused state, the chromatic aberration may be generated since the values of R and B become greater than actual values of R and B. Thus, it is considered that the brightness of a luminance component is higher than that of a real luminance signal since the values of R and B are increased. In this case, the G channel seems to have a correct value and thus, the value of $G_i$ may be the same as that of $G_O$. However, when purple chromatic aberration is cancelled from the U and V channels, the values of $U_o$ and $V_o$ become respectively smaller than those of $U_i$ and $V_i$ and thus, the value of $G_o$ becomes larger than that of $G_i$ as expressed in Equation (7). Accordingly, in order for the value of $G_o$ to be equal to that of $G_i$, the value of $Y_o$ should be smaller than that of $Y_i$. Here, in order for the value of $G_o$ to be equal to that of $G_i$, the value of $Y_o$ is obtained by subtracting the differences between the values of $U_o$ and $U_i$ and between $V_o$ and $V_i$ from $Y_i$. The degrees of the value of $G_o$ that is respectively affected by the values of $U_o$ and $V_o$ are respectively 0.345 and 0.714 as in Equation (7). Thus, the corrected $Y_o$ may be expressed as follows:

$$Y_o(i,j) = Y_i(i,j) - 0.345 \cdot |U_i(i,j) - U_o(i,j)| - 0.714 \cdot |V_i(i,j) - V_o(i,j)| \quad (8)$$

If green chromatic aberration is generated and the G channel has a correct value, it is deemed that the chromatic aberration is generated because R and B become dark. Thus, the Y signal has a darker value than a real luminance value. As described above, in this case, in order for the value of $G_o$ to be equal to that of $G_i$, the value of $Y_o$ should be larger than that of $Y_i$. Here, in order for the value of $G_o$ to be equal to that of $G_i$, the value of $Y_o$ is obtained by adding the differences between the values of $U_o$ and $U_i$ and between $V_o$ and $V_i$ to $Y_i$. Thus, the corrected $Y_o$ may be expressed as follows:

$$Y_o(i,j) = Y_i(i,j) + 0.345 \cdot |U_i(i,j) - U_o(i,j)| + 0.714 \cdot |V_i(i,j) - V_o(i,j)| \quad (9)$$

Equation (9) may also be expressed as follows:

$$Y_o(i,j) = \begin{cases} Y_i(i,j) - 0.345 \cdot \left|\frac{U_i(i,j)-}{U_o(i,j)}\right| - 0.714 \cdot \left|\frac{V_i(i,j)-}{V_o(i,j)}\right|, \\ \quad \text{if } U_i(i,j) > 0 \text{ and } V_i(i,j) > 0 \\ Y_i(i,j) - 0.345 \cdot \left|\frac{U_i(i,j)-}{U_o(i,j)}\right| + 0.714 \cdot \left|\frac{V_i(i,j)-}{V_o(i,j)}\right|, \\ \quad \text{if } U_i(i,j) > 0 \text{ and } V_i(i,j) < 0 \\ Y_i(i,j) + 0.345 \cdot \left|\frac{U_i(i,j)-}{U_o(i,j)}\right| - 0.714 \cdot \left|\frac{V_i(i,j)-}{V_o(i,j)}\right|, \\ \quad \text{if } U_i(i,j) < 0 \text{ and } V_i(i,j) > 0 \\ Y_i(i,j) + 0.345 \cdot \left|\frac{U_i(i,j)-}{U_o(i,j)}\right| + 0.714 \cdot \left|\frac{V_i(i,j)-}{V_o(i,j)}\right|, \\ \quad \text{if } U_i(i,j) < 0 \text{ and } V_i(i,j) < 0 \end{cases} \quad (10)$$

When the Y signal is re-adjusted as described above, the luminance component affected by the chromatic aberration may be compensated for to enhance the contrast of the image, thereby improving the quality of the image.

Figure 6:
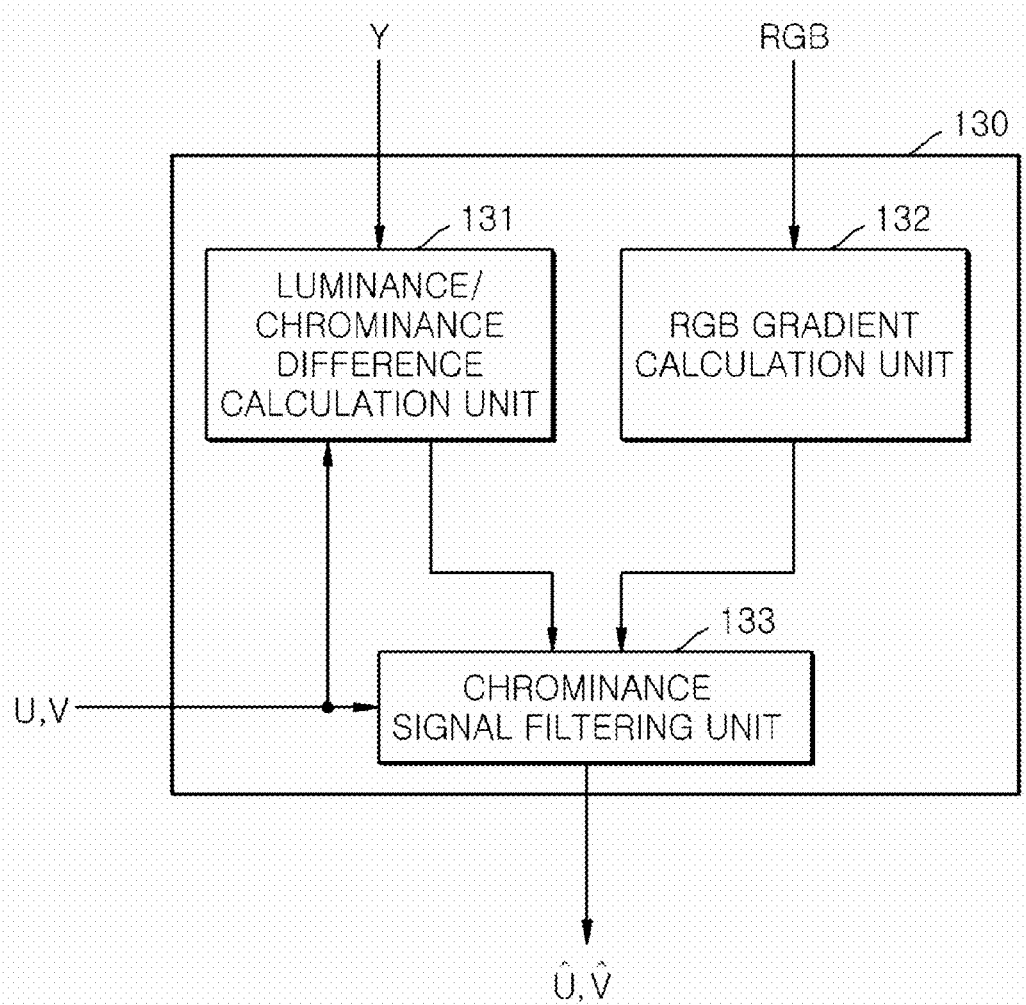
FIG. 6 is a block diagram of a chrominance signal generation unit of FIG. 1 or 2 according to an embodiment of the present invention.

FIG. 6 is a block diagram of the chrominance signal generation unit 130 of FIG. 1 or 2 according to an embodiment of the present invention. Referring to FIG. 6, the chrominance signal generation unit 130 includes a luminance/chrominance difference calculation unit 131, an RGB gradient calculation unit 132, and a chrominance signal filtering unit 133.

The luminance/chrominance difference calculation unit 131 calculates a luminance/chrominance difference by using luminance and chrominance signals received from the YUV conversion unit 120. Here, the luminance/chrominance difference includes the difference between the values of luminance and chrominance signals of a current pixel and other pixels that fall within the filtering range of a mask. Here, the mask is an asymmetrical mask and is applied to an image by changing the range of filtering of the mask to respective regions of an image, as described above with reference to FIG. 5. In addition, the luminance/chrominance difference may be calculated in the horizontal or vertical direction, and preferably, in both the horizontal and vertical directions.

In Equation (6), $D_Y(i,j+l)$ indicating the luminance/chrominance difference, represents the difference between the values of luminance or chrominance signals of the current pixel and the other pixels. $D_Y(i,j+l)$ may be calculated (only in the horizontal direction here), as follows:

$$D_Y(i,j+l) = c_y \cdot \max\{|Y_i(i,j)-Y_i(i,j+l)|, |C_i(i,j)-C_i(i,j+l)|\}$$

$$D_Y(i+m,j) = c_y \cdot \max\{|Y_i(i,j)-Y_i(i+m,j)|, |C_i(i,j)-C_i(i+m,j)|\} \quad (11)$$

That is, Equation (11) includes information about the differences between the brightness and color of the other pixels and the current pixel. If the difference between the brightness of the current pixel and the other pixels is large, the characteristics of the other pixels are determined to be not similar to those of the current pixel and the other pixels are excluded from a weighted sum of neighboring pixels. If the difference between the color of the current pixel and the other pixels is large, the other pixels are also excluded from the weighted sum of neighboring pixels. That is, pixels that are less similar to the current pixel are less considered in filtering and thus, the original image can be maintained. In Equation (11), $c_y$ denotes a constant that is experientially obtained and is used to determine a weight to be assigned to $D_Y(i,j+l)$ compared with $D_G(i,j+l)$, $D_B(i,j+l)$, and $D_R(i,j+l)$ that denote gradients of RGB signals. The greater the constant $c_y$, the more the color of the original image is maintained. However, that the color of the original image is maintained means that chromatic aberration is not satisfactorily cancelled from the original image. In the current embodiment, the constant $c_y$ may be set to "1".

The RGB gradient calculation unit 132 calculates gradients of respective R, G, and B channels from received RGB signals. Here, the gradients may be calculated in the horizontal or vertical direction, and preferably, in both the horizontal and vertical directions. The difference between the colors of the RGB channels may also be considered as s described above. The difference in the gradients and colors of the RGB channels may be calculated using Equations (12) to (14). Here, it is assumed that the difference between the gradients and colors of the RGB channels is calculated only in the horizontal direction.

$$D_G(i,j+l) = \begin{cases} |G_i(i,j+l)-G_i(i,j+l-1)|, & \text{if } l > 0 \\ |G_i(i,j+l)-G_i(i,j+l+1)|, & \text{if } l < 0 \\ 0, & \text{if } l = 0 \end{cases} \quad (12)$$

$$D_G(i+m,j) = \begin{cases} |G_i(i+m,j)-G_i(i+m-1,j)|, & \text{if } m > 0 \\ |G_i(i+m,j)-G_i(i+m+1,j)|, & \text{if } m < 0 \\ 0, & \text{if } m = 0, \end{cases}$$

where $D_G(i,j+l)$ denotes a gradient of the G channel. Here, in order to calculate all gradients within a given region, the range of calculation is divided into $l>0$, $l<0$, and $l=0$.

$$D_B(i,j+l) = \begin{cases} \max\begin{bmatrix} |B_i(i,j+l)-B_i(i,j+l-1)|, \\ c_b \cdot |B_i(i,j+l)-G_i(i,j+l)| \end{bmatrix}, & \text{if } l > 0 \\ \max\begin{bmatrix} |B_i(i,j+l)-B_i(i,j+l+1)|, \\ c_b \cdot |B_i(i,j+l)-G_i(i,j+l)| \end{bmatrix}, & \text{if } l < 0 \\ c_b \cdot |B_i(i,j+l)-G_i(i,j+l)|, & \text{if } l = 0 \end{cases} \quad (13)$$

$$D_B(i+m,j) = \begin{cases} \max\begin{bmatrix} |B_i(i+m,j)-B_i(i+m-1,j)|, \\ c_b \cdot |B_i(i+m,j)-G_i(i+m,j)| \end{bmatrix}, & \text{if } m > 0 \\ \max\begin{bmatrix} |B_i(i+m,j)-B_i(i+m+1,j)|, \\ c_b \cdot |B_i(i+m,j)-G_i(i+m,j)| \end{bmatrix}, & \text{if } m < 0 \\ c_b \cdot |B_i(i+m,j)-G_i(i+m,j)|, & \text{if } m = 0, \end{cases}$$

where $D_B(i,j+l)$ denotes a larger value from among the gradient of the B channel and the difference between the colors of the G channel and the B channel. $c_b$ denotes a constant which is to be multiplied by the color difference. The constant $c_b$ is obtained experimentally. In general, since the color difference is greater than the gradient, the constant $c_b$ is used to appropriately adjust the importance of the color difference and the gradient.

$$D_R(i,j+l) = \begin{cases} \max\begin{bmatrix} |R_i(i,j+l)-R_i(i,j+l-1)|, \\ c_r \cdot |R_i(i,j+l)-G_i(i,j+l)| \end{bmatrix}, & \text{if } l > 0 \\ \max\begin{bmatrix} |R_i(i,j+l)-R_i(i,j+l+1)|, \\ c_r \cdot |R_i(i,j+l)-G_i(i,j+l)| \end{bmatrix}, & \text{if } l < 0 \\ c_r \cdot |R_i(i,j+l)-G_i(i,j+l)|, & \text{if } l = 0 \end{cases} \quad (14)$$

$$D_R(i+m, j) = \begin{cases} \max\begin{bmatrix} |R_i(i+m, j) - R_i(i+m-1, j)|, \\ c_r \cdot |R_i(i+m, j) - G_i(i+m, j)| \end{bmatrix}, & \text{if } m > 0 \\ \max\begin{bmatrix} |R_i(i+m, j) - R_i(i+m+1, j)|, \\ c_r \cdot |R_i(i+m, j) - G_i(i+m, j)| \end{bmatrix}, & \text{if } m < 0 \\ c_r \cdot |R_i(i+m, j) - G_i(i+m, j)|, & \text{if } m = 0, \end{cases}$$

where $D_R(i,j+1)$ denotes a larger value from among the gradient of the R channel and the difference between the colors of the R channel and the G channel. $c_r$ denotes a constant which is to be multiplied by the color difference and is obtained experimentally. In general, since the color difference is larger than the gradient, the constant $c_r$ is used to appropriately adjust the importance of the color difference and the gradient.

In the current embodiment, the constants $c_b$ and $c_r$ are set to 0.25.

The function of a value $D_Y(i,j+1)$ is opposite to those of the above values $D_G(i,j+1)$, $D_B(i,j+1)$, and $D_R(i,j+1)$. The values $D_G(i,j+1)$, $D_B(i,j+1)$, and $D_R(i,j+1)$ are used to reduce color but the value $D_Y(i,j+1)$ is used to maintain color. The values $D_G(i,j+1)$, $D_B(i,j+1)$, and $D_R(i,j+1)$ are obtained by calculating the differences between the gradients values and colors of adjacent pixels.

The chrominance signal filtering unit 133 filters the chrominance signal by reflecting the RGB gradients and the luminance/chrominance difference, thereby generating a chrominance signal for correcting chromatic aberration. Here, filtering may be performed in the horizontal or vertical direction, and preferably, in both the horizontal and vertical directions. Chrominance signal filtering is described above with reference to Equations (4) to (6).

Figure 7:
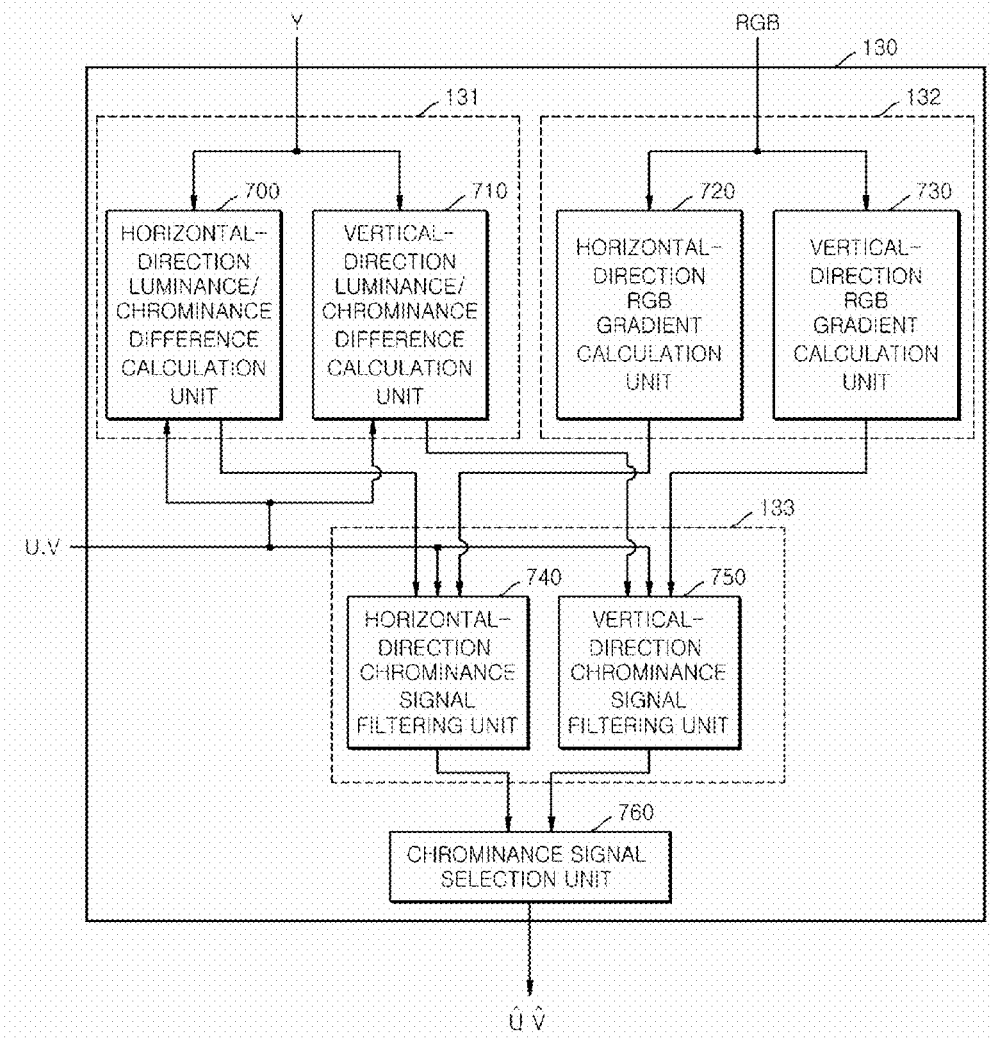
FIG. 7 is a block diagram of the chrominance signal generation unit of FIG. 1 or 2 according to another embodiment of the present invention.

FIG. 7 is a block diagram of the chrominance signal generation unit 130 of FIG. 1 or 2 according to another embodiment of the present invention. The chrominance signal generation unit 130 includes a luminance/chrominance difference calculation unit 131, an RGB gradient calculation unit 132, and chrominance signal filtering unit 133. Referring to FIG. 7, the luminance/chrominance difference calculation unit 131 includes a horizontal-direction luminance/chrominance difference calculation unit 700 and a vertical-direction luminance/chrominance difference calculation unit 710. The RGB gradient calculation unit 132 includes a horizontal-direction RGB gradient calculation unit 720 and a vertical-direction gradient calculation unit 730. The chrominance signal filtering unit 133 includes a horizontal-direction chrominance filtering unit 740 and a vertical-direction chrominance signal filtering unit 750. The chrominance signal generation unit 130 further includes a chrominance signal selection unit 760 that compares the result of filtering in the horizontal direction with the result of filtering in the vertical direction and outputs the comparison result.

Methods of calculating a luminance/chrominance difference and RGB gradients in the horizontal direction have been described above with reference to Equations (11) to (14). Methods of calculating a luminance/chrominance difference and RGB gradients in the vertical direction have also been described above with reference to Equations (11) to (14). Filtering is performed in the vertical direction as described with reference to Equation (4), and is the same as performing filtering in the horizontal direction except that the size of a mask is small.

The chrominance signal selection unit 760 compares the result of filtering in the horizontal direction which is received from the horizontal-direction chrominance filtering unit 740 with the result of filtering in the vertical direction which is received from the horizontal-direction chrominance filtering unit 740, and then outputs the comparison result. Preferably, one of the result of filtering in the horizontal direction and the result of filtering in the vertical direction, which has less color components, is selected as a final chrominance signal for correcting chromatic aberration. The final chrominance signal may be selected using the following:

$$\hat{C}(i, j) = \begin{cases} \hat{C}_h(i, j), & \text{if } |\hat{C}_h(i, j)| < |\hat{C}_v(i, j)| \\ \hat{C}_v(i, j), & \text{otherwise,} \end{cases} \quad (15)$$

where $\hat{C}(i,j)$ denotes the final chrominance signal, and $\hat{C}_h(i,j)$ and $\hat{C}_v(i,j)$ denote signals respectively indicating the result of filtering in the horizontal direction and the result of filtering in the vertical direction. The more the value of a chrominance signal approximates to "0", the closer the color of the chrominance signal is to an achromatic color. The signal $\hat{C}_h(i,j)$ or $\hat{C}_v(i,j)$, the absolute value of which is less than that of the other signal is considered as having color closer to an achromatic color. Thus, the final chrominance signal $\hat{C}_h(i,j)$ is selected as the signal $\hat{C}_h(i,j)$ or $\hat{C}_v(i,j)$ by using Equation (15).

Figure 10:
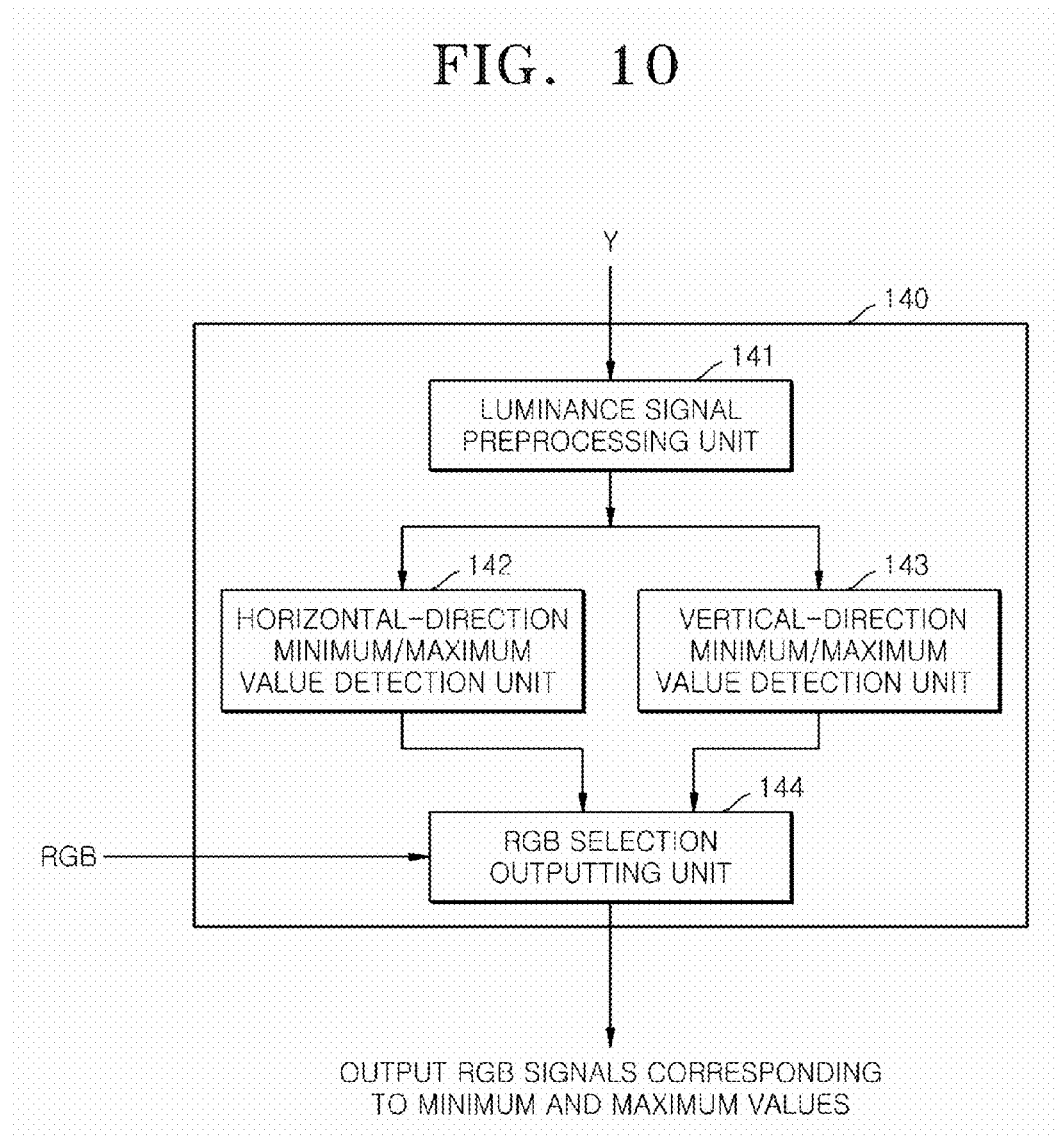
FIG. 10 is a block diagram of a chromatic aberration degree determining unit of FIG. 1 or 2 according to an embodiment of the present invention.

FIG. 10 is a block diagram of the chromatic aberration degree determining unit 140 of FIG. 1 or 2 according to an embodiment of the present invention. Referring to FIG. 10, the chromatic aberration degree determining unit 140 includes a luminance signal preprocessing unit 141, a horizontal-direction minimum/maximum value detection unit 142, a vertical-direction minimum/maximum value detection unit 143, and an RGB selection outputting unit 144.

The luminance signal preprocessing unit 141 preprocesses a Y signal received from the YUV conversion unit 120 of FIG. 1 or 2. For example, the luminance signal preprocessing unit 141 performs blurring on the Y signal. Preprocessing of the luminance signal may be selectively performed according to circumstances.

The horizontal-direction minimum/maximum value detection unit 142 detects a local maximum value and a local minimum value of the Y signal in the horizontal direction. Similarly, the vertical-direction minimum/maximum value detection unit 143 detects a local maximum value and a local minimum value of the Y signal in the vertical direction.

The RGB selection outputting unit 144 selects and outputs RGB values corresponding to a larger maximum value and local minimum value from among the maximum and minimum values in the horizontal and vertical directions by using received an RGB signal.

Alternatively, a local maximum value and a local minimum value may be detected in only one of the horizontal and vertical directions. In this case, the RGB selection outputting unit 144 outputs RGB signals corresponding to the detected maximum and minimum values.

In the current embodiment, the Y signal is used to measure the degree of chromatic aberration. As described above, a luminance component indicates the brightness of an image and chromatic aberration is more visible in a region having a large brightness difference. That is, the degree of chromatic aberration may be measured using contrast information of the Y signal. Accordingly, in order to measure the degree of chromatic aberration by using the contrast of the image, a location on the Y signal, which has local minimum and maximum values is detected in both the vertical and horizontal directions. Methods of detecting local minimum and maximum values in the vertical and horizontal directions are exactly the same as each other. Thus, a method of detecting local minimum and maximum values in the horizontal direction will now be described.

Minimum and maximum values when the degree of chromatic aberration increases from left to right and minimum and maximum values when the degree of chromatic aberration decreases from left to right, are calculated as follows:

$$l_{E\ max} = \arg\max_{l \in \{l | 0 \leq l \leq L_1\}} Y_i(i,j+l)$$

$$l_{E\ min} = \arg\min_{l \in \{l | 0 \leq l \leq L_1\}} Y_i(i,j+l)$$

$$l_{W\ max} = \arg\max_{l \in \{l | -L_2 \leq l \leq 0\}} Y_i(i,j+l)$$

$$l_{W\ min} = \arg\min_{l \in \{l | -L_2 \leq l \leq 0\}} Y_i(i,j+l) \quad (16)$$

That is, two minimum and two maximum values are detected in the horizontal direction. When the degree of chromatic aberration increases, a minimum value is detected in the left direction of a current pixel and a maximum value is detected in the right direction of the current pixel. When the degree of chromatic aberration decreases, a minimum value is detected in the left direction of the current pixel and a maximum value is detected in the right direction of the current pixel.

In Equation (16), $l_{Emax}$, $l_{Emin}$, $l_{Wmax}$, and $l_{Wmin}$ respectively denote locations of the maximum and minimum values in the right direction of the current pixel and the maximum and minimum values in the left direction of the current pixel. The reason why the maximum and minimum values are detected in both the left and right direction of the current pixel is to prevent all minimum and maximum values from being distributed to one side of the current pixel in a mask. If all minimum and maximum values are distributed to one side of the current pixel in the mask, the differences between the minimum and maximum values cannot be considered as being contrast information of the current pixel. Also, in order to detect minimum and maximum values in both the left and right directions, if it is assumed that the degree of chromatic aberration increases, the detection is stopped when the degree of chromatic aberration decreases. Similarly, if it is assumed that the degree of chromatic aberration decreases, the detection is stopped when the degree of chromatic aberration increases. The coordinates of a minimum value and a maximum value having a larger difference therebetween are selected as those of final minimum and maximum values from among the detected two minimum values and two maximum values, as follows:

$$\text{If}(|Y_i(i,j+l_{E\ max}) - Y_i(i,j+l_{W\ min})| > |Y_i(i,j+l_{W\ max}) - Y_i(i,j+l_{g\ min})|)$$

$$l_{max} = l_{E\ max}$$

$$l_{min} = l_{W\ min}$$

else $$l_{max} = l_{W\ max}$$

$$l_{min} = l_{E\ max} \quad (17)$$

Similarly, the coordinates $k_{max}$ and $k_{min}$ of minimum and maximum values in the vertical direction are calculated. Lastly, the differences between the maximum and minimum values are calculated using location values of the minimum and maximum values in the vertical and horizontal directions, the location of minimum and maximum values having a larger difference therebetween is determined to be the locations of final minimum and maximum values of the current pixel, and then, contrast information of the image is obtained using R, G, B values on the respective determined locations. If the R, G, B values on the respective determined locations are R1, R2, G1, G2, B1, and B2, the R, G, B values may be expressed as follows;

$$\text{If}(|Y_i(i,j+l_{max}) - Y_i(i,j+l_{min})| > |Y_i(i+k_{max},j) - Y_i(i+k_{min},j)|)$$

$$R1 = R_i(i,j+l_{max}), G1 = G_i(i,j+l_{max}), B1 = B_i(i,j+l_{max})$$

$$R2 = R_i(i,j+l_{min}), G2 = G_i(i,j+l_{min}), B2 = B_i(i,j+l_{min})$$

else $$R1 = R_i(i+k_{max},j), G1 = G_i(i+k_{max},j), B1 = B_i(i+k_{max},j)$$

$$R2 = R_i(i+k_{min},j), G2 = G_i(i+k_{min},j), B2 = B_i(i+k_{min},j) \quad (18)$$

Figure 11:
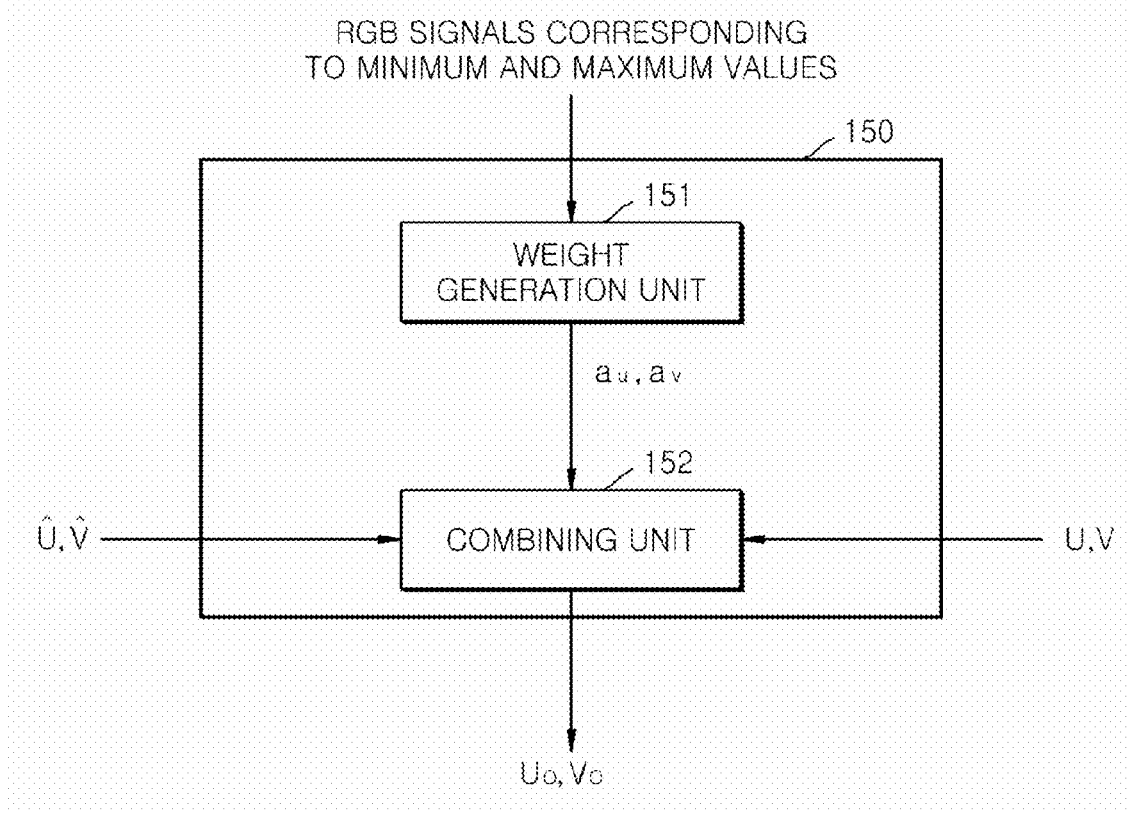
FIG. 11 is a block diagram of a chrominance signal combining unit of FIG. 1 or 2 according to an embodiment of the present invention.

FIG. 11 is a block diagram of the chrominance signal combining unit 150 of FIG. 1 or 2 according to an embodiment of the present invention. Referring to FIG. 11, the chrominance signal combining unit 150 includes a weight generation unit 151 and a combining unit 152.

The weight generation unit 151 receives RGB signals from the location of maximum and minimum values from the chromatic aberration degree determining unit 140 of FIG. 1, 2 or 10 and then generates weights $a_u$ and $a_v$.

The combining unit 152 combines U and V signals with chrominance signals $\hat{U}$ and $\hat{V}$ correcting chromatic aberration by using the weights $a_u$ and $a_v$ and then outputs final $U_O$ and $V_O$ signals.

Contrast information in U and V channels may be calculated using the RGB values R1, R2, G1, G2, B1, and B2 calculated using Equation (18), as follows:

$$\text{cont}U = \max\{0.5 \cdot |R1-R2|, |G1-G2|, |B1-B2|\}$$

$$\text{cont}V = \max\{|R1-R2|, |G1-G2|, 0.5 \cdot |B1-B2|\} \quad (19),$$

Here, weights $a_U(i,j)$ and $a_V(i,j)$ are calculated using the contrast information contU and contV as follows:

$$a_U(i,j) = 1.0 - f(\text{cont}U)$$

$$a_V(i,j) = 1.0 - f(\text{cont}V) \quad (20),$$

where f( ) denotes a monotonically increasing function and returns a value ranging from 0 to 1. That is, the greater the contrast of an image, the more the weights $a_U(i,j)$ and $a_V(i,j)$ are determined to approximate to "0". In this case, a chrominance signal for correcting chromatic aberration is used as a final output signal. Also, the less the contrast of the image, the more the weights $a_U(i,j)$ and $a_V(i,j)$ are determined to approximate to "1", and the closer the final output signal is to the original chrominance signal. In this case, the color of the original chrominance signal is maintained. However, in the case of R or G channel, when the color of the original chrominance signal is damaged, the damaged color is visible to people. Thus, when the color of the R or G channel is bright, the original color is maintained by reducing the degree of chromatic aberration.

Figure 12:
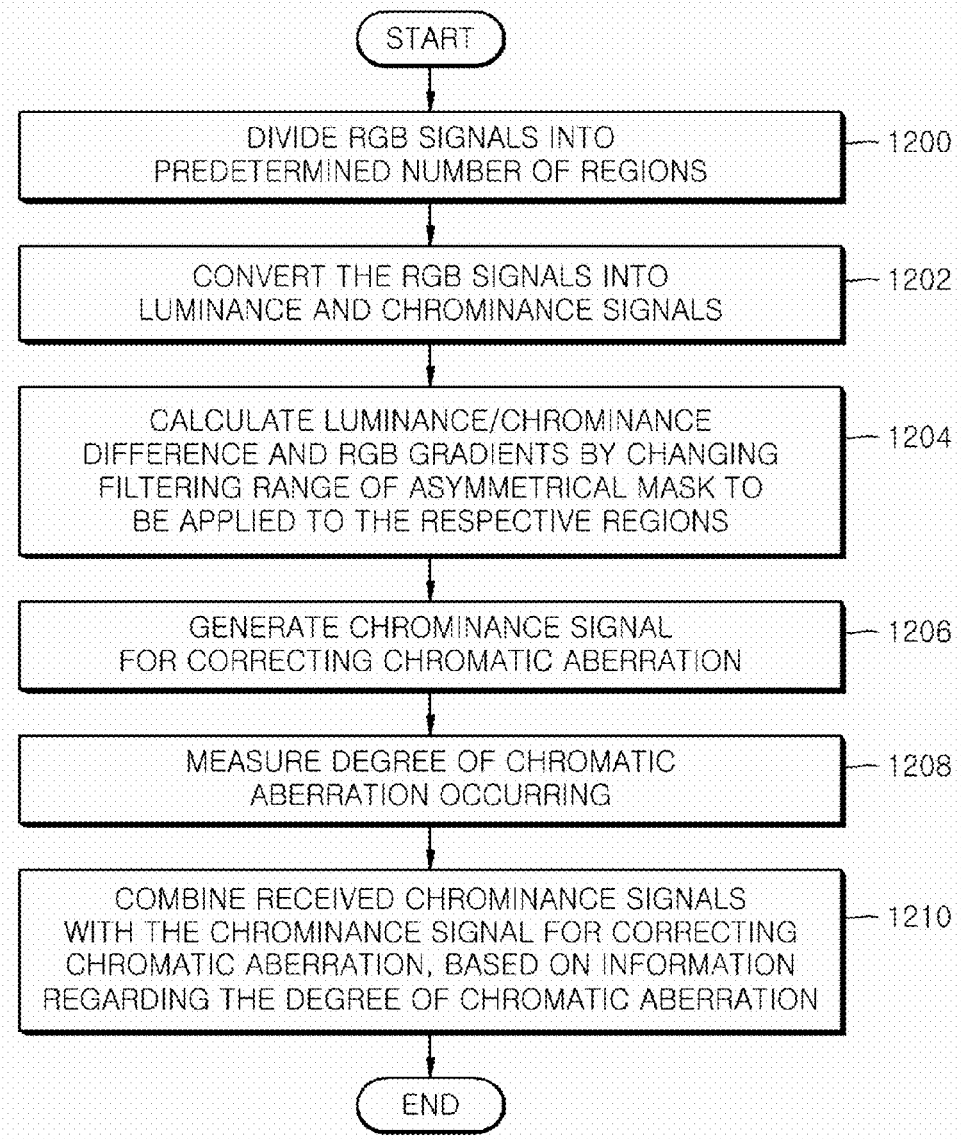
FIG. 12 is a flowchart illustrating a method of canceling chromatic aberration, according to an embodiment of the present invention.

FIG. 12 is a flowchart illustrating a method of canceling chromatic aberration, according to an embodiment of the present invention. Referring to FIG. 12, in operation 1200, RGB signals are divided into a predetermined number of regions. In operation 1202, the RGB signals are converted into luminance and chrominance signals. In the current embodiment, for the conversion of the RGB signal, YUV color coordinates is used but the present invention is not limited thereto and other color coordinates may be used. In operation 1204, luminance/chrominance differences and RGB gradients are calculated by changing the range of filtering of an asymmetrical mask to be applied to the respective regions of the RGB signal. In operation 1206, a chrominance signal for correcting chromatic aberration is generated by filtering the chrominance signal while reflecting the RGB gradients and luminance/chrominance differences. In operation 1208, the degree of chromatic aberration is measured using contrast information of an input luminance signal. In operation 1210, the chrominance signal for correcting chromatic aberration obtained in operation 1206 is combined with an input chrominance signal based on the degree of chromatic aberration.

Figure 13:
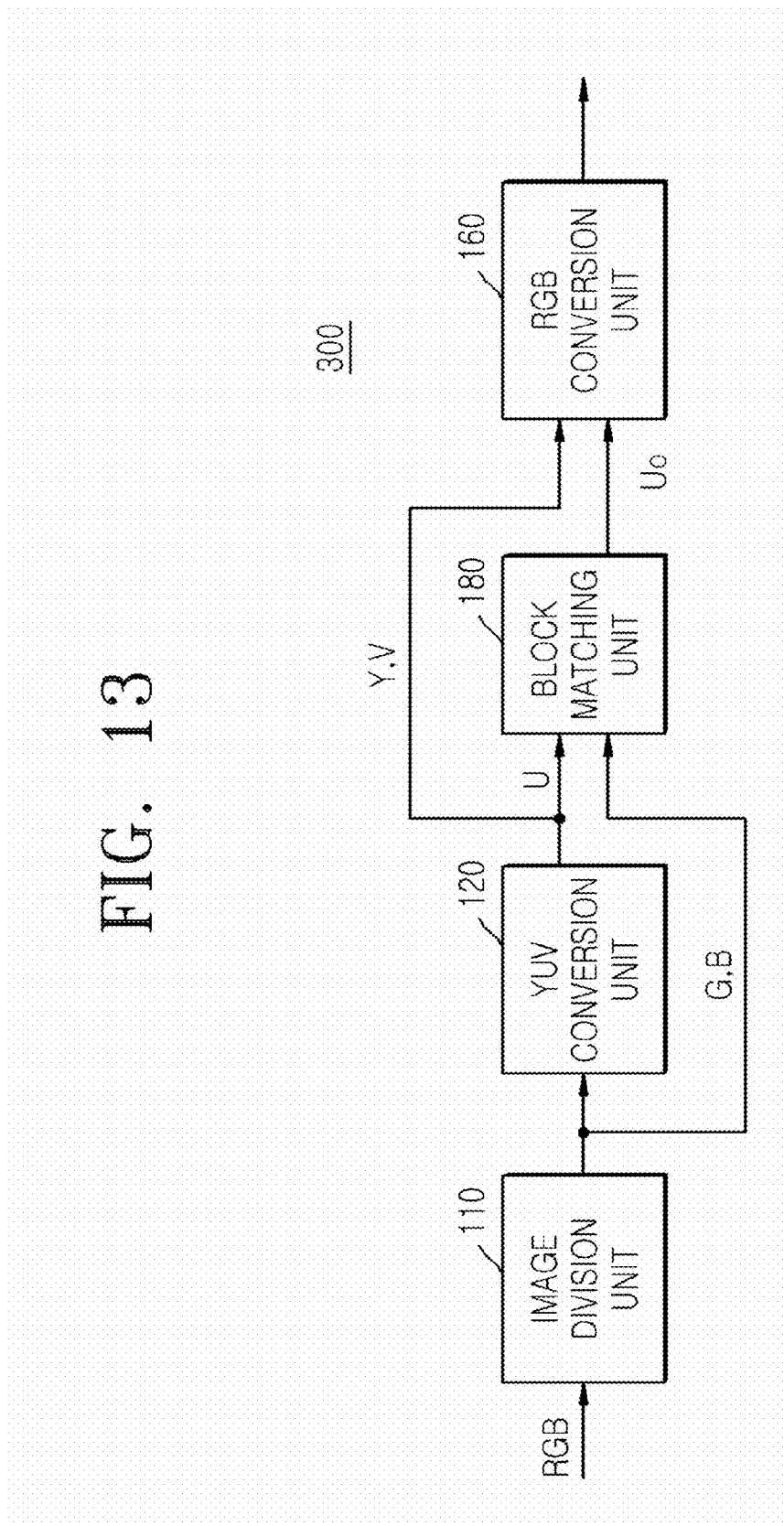
FIG. 13 is a schematic block diagram of an apparatus for canceling chromatic aberration, according to another embodiment of the present invention.

FIG. 13 is a schematic block diagram of an apparatus 300 for canceling chromatic aberration, according to another embodiment of the present invention. Referring to FIG. 13, the apparatus 300 includes an image division unit 110, a YUV conversion unit 120, a block matching unit 180 and an RGB conversion unit 160. Hereinafter, elements of the apparatus 300 such as those described above with reference to FIGS. 1 and 2 will be briefly described and the other elements will be described in detail.

The image division unit 110 divides a received RGB image into a predetermined number of regions. The predetermined number may be arbitrarily described.

The YUV conversion unit 120 receives RGB signals from the YUV conversion unit 110 and converts them into YUV signals. In the current embodiment, the RGB signals are converted into YUV signals but the present invention is not limited thereto and the RGB signals may be converted into other color space coordinates, e.g., luminance/chrominance coordinates including YCrCb, Lab, and YCC.

The block matching unit 180 performs block matching a G signal and a B signal received from image division unit 110 on a block-by-block basis, and adjusts the U signal received from the YUV conversion unit 120 based on the result of performing block matching. That is, a block including a candidate pixel is matched with a block including a current pixel that is to be processed in each of the regions, and the U and V signals which are chrominance signals are adjusted based on the result of matching. In detail, a candidate pixel is selected from each of the regions, based the characteristics of chromatic aberration, e.g., the principle that blue chromatic aberration occurring due to a combination of lateral chromatic aberration and longitudinal chromatic aberration blurs from a central part of an image to a peripheral part thereof. A method of selecting a candidate pixel based the characteristics of chromatic aberration will later be described with reference to FIG. 15.

Then SADs between B signals of blocks each including a candidate pixels and corresponding G signals of blocks each including a current pixel are calculated, and the U signal of the chrominance signals is adjusted according to the ratio of the SADs. Methods of calculating an SAD and adjusting chrominance signals will later be described with reference to FIG. 16.

Here, the U signal is greatly affected by chromatic aberration occurring due to the B signal. Thus, the chromatic aberration is cancelled by extracting information for correcting the chromatic aberration by performing block matching between the G signal in a well-focused state and the B signal that undergoes the chromatic aberration and applying the extracted information to the U signal. In the current embodiment, chromatic aberration occurring due to a signal from a B channel is cancelled but chromatic aberration occurring due to a signal from another channel may be cancelled similarly. For example, chromatic aberration occurring due to a signal of an R channel, i.e., the R signal, may be cancelled by performing block matching on a G signal and the R signal and applying the result of performing block matching to a V signal.

The RGB conversion unit 160 converts the chrominance signals Y and V received from the YUV conversion unit 120 and a $U_o$ signal received from the block matching unit 180 into final RGB signals and outputs the final RGB signals. The final RGB signals correspond to an RGB image from which chromatic aberration occurring due to the signal from the B channel is removed.

Figure 14:
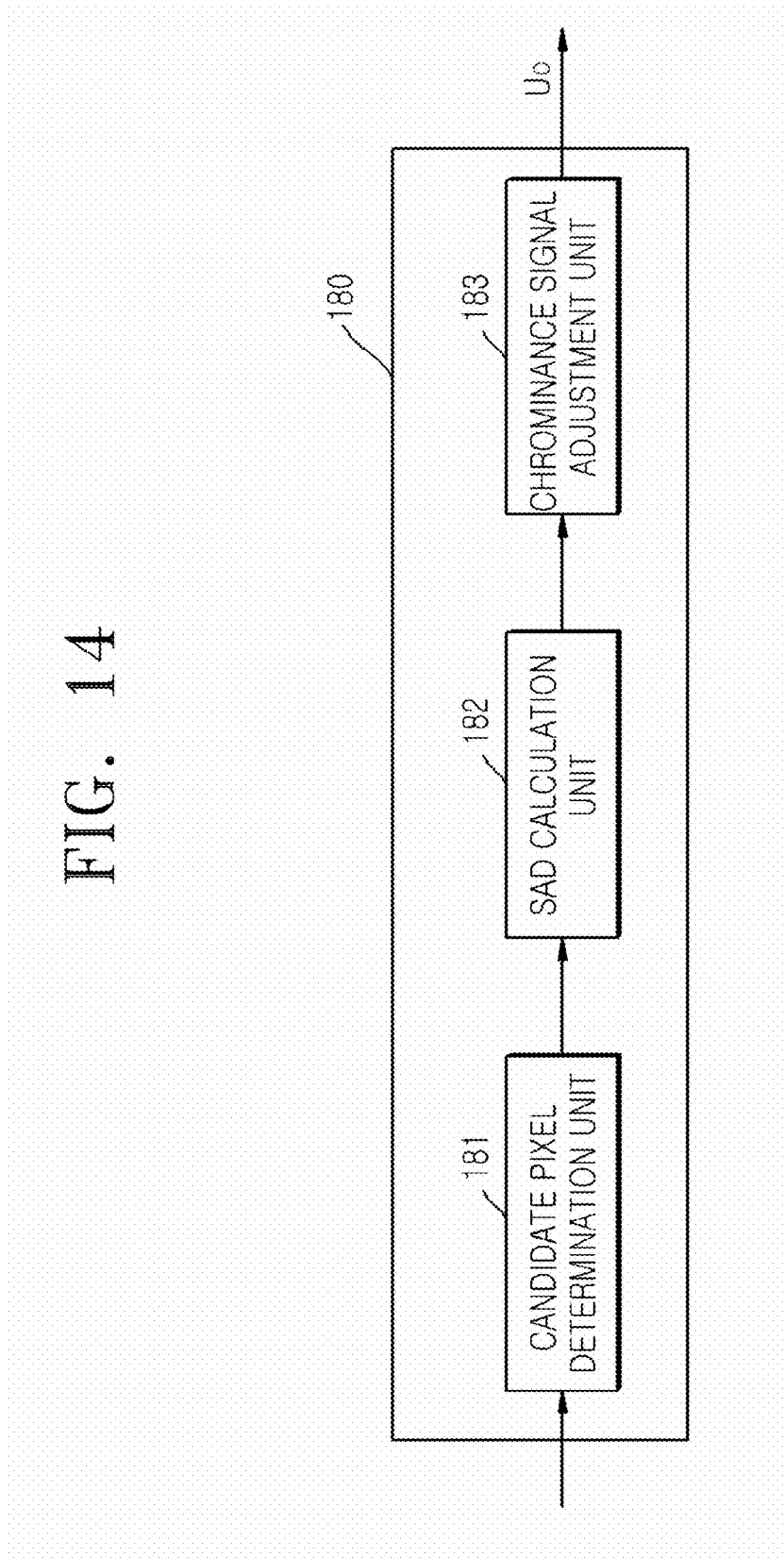
FIG. 14 is a block diagram illustrating in detail a block matching unit illustrated in FIG. 13 according to an embodiment of the present invention.

FIG. 14 is a block diagram illustrating in detail the block matching unit 180 illustrated in FIG. 13 according to an embodiment of the present invention. Referring to FIG. 14, the block matching unit 180 includes a candidate pixel determination unit 181, an SAD calculation unit 182 and a chrominance signal adjustment unit 183.

The candidate pixel determination unit 181 determines a candidate pixel for each of regions of an input image based on the characteristics of chromatic aberration occurring. For example, it is possible to divide the image into four quadrants and respectively determine different candidate pixels for the four quadrants.

Figure 15:
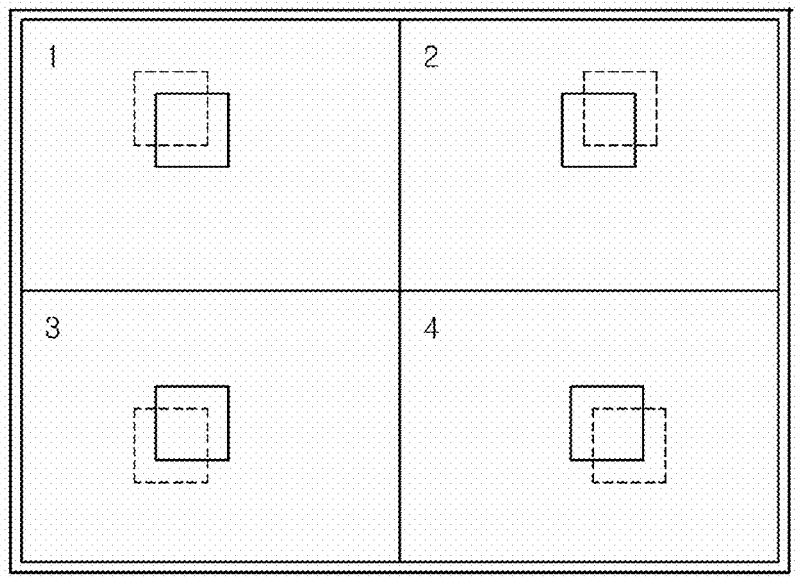
FIG. 15 illustrates a method of dividing an input image into four quadrants and determining candidate pixels of each of these quadrants according to an embodiment of the present invention.

FIG. 15 illustrates a method of dividing an input image into first through fourth quadrants 1 through 4 and determining candidate pixels of each of these quadrants according to an embodiment of the present invention. Referring to FIG. 15, a central pixel and an upper left pixel are selected as candidate pixels in the first quadrant 1, a central pixel and an upper right pixel are selected as candidate pixels in the second quadrant 2, a central pixel and a lower left pixel are selected as candidate pixels in the third quadrant 3, and a central pixel and a lower right pixel are selected as candidate pixels in the fourth quadrant 4. In the current embodiment, two candidate pixels are selected for each of the first through fourth quadrants 1 through 4 but the present invention is not limited thereto and more than two candidate pixels may be selected.

The locations of candidate pixels may be determined according to the degrees of longitudinal chromatic aberration and lateral chromatic aberration occurring. In the current embodiment, pixels on positions that are shifted by two pixels from a current pixel that is to be processed in the upper, lower, left and right directions, are selected as candidate pixels in the first through fourth quadrants 1 to 4. That is, if the coordinates of the current pixel are (i,j), pixels whose coordinates are (i,j) and (i−2,j−2) are used as candidate pixels in the first quadrant 1, pixels whose coordinates are (i,j) and (i−2,j+2) are used as candidate pixels in the second quadrant 2, pixels whose coordinates are (i,j) and (i+2,j−2) are used as candidate pixels in the third quadrant 3, and pixels whose coordinates are (i,j) and (i+2,j+2) are used as candidate pixels in the fourth quadrant 4.

The SAD calculation unit 182 of FIG. 14 calculates SADs between B signals of blocks including the candidate pixels and G signals of blocks including current pixels that are to be processed. For example, the SAD calculation unit 182 calculates a first SAD between a B signal of a block including a first candidate pixel and a G signal of a block including a current pixel and a second SAD between a B signal of a block including a second candidate pixel and the G signal of the block including the current block. Here, the blocks denote image regions that include candidate pixels and that are to be processed using a mask. For example, the blocks may be 3×3 pixel regions including candidate pixels.

Figure 16:
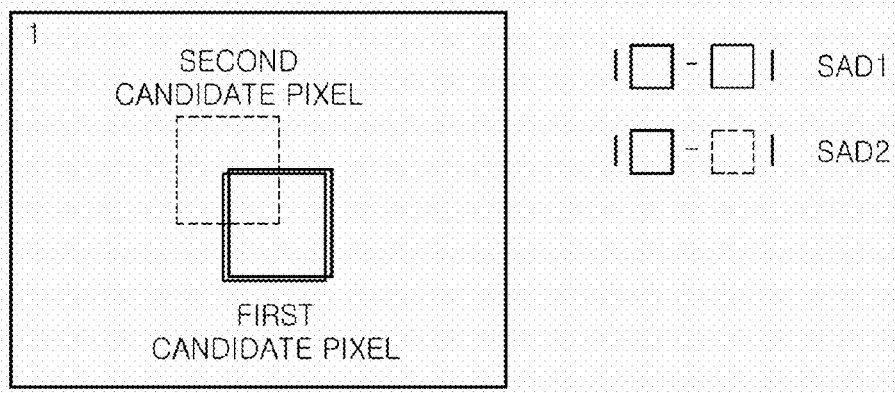
FIG. 16 is a pictorial diagram illustrating a method of calculating a sum of absolute distance (SAD) between image blocks each containing a candidate pixel, according to an embodiment of the present invention.

FIG. 16 illustrates a method of calculating an SAD between the image blocks of the first quadrant 1 of FIG. 15 which contain a candidate pixel, according to an embodiment of the present invention. As described above, in the first quadrant 1, a pixel (i−2,j−2) on a position that is shifted by two pixels from a current pixel (i,j) in the upper left direction is selected as a candidate pixel. As illustrated in FIG. 16, a first SAD SAD1 is defined to be the sum of absolute values of a G signal and a B signal of a block including the current pixel (i,j), and a second SAD SAD2 is defined to be the sum of absolute values of the G signal of the block including the current pixel and a B signal of a block including the a pixel (i−2,j−2) on the position that is shifted by two pixels from the current pixel (i,j). The first and second SADs SAD1 and SAD2 may be expressed as follows:

$$SAD1 = \sum_{m=-k_1}^{k_1} \sum_{n=-k_2}^{k_2} |G(i+m, j+n) - B(i+m, j+n)| \quad (21)$$

$$SAD2 = \sum_{m=-k_1}^{k_1} \sum_{n=-k_2}^{k_2} |G(i+m, j+n) - B(i-2+m, j-2+n)|$$

$$SAD3 = \sum_{m=-k_1}^{k_1} \sum_{n=-k_2}^{k_2} |B(i+m, j+n) - B(i-2+m, j-2+n)|,$$

where SAD3 indicates the amount of a high-frequency component of a signal of a B channel. For block matching, an SAD between the values of the G signal and B signal of the coordinates (i,j) of the current pixel is calculated and determined to be the first SAD1. In Equation (21), $k_1$ and $k_2$ denote coefficients for determining the filtering range of a mask for calculating the SAD. In the current embodiment, the coefficients $k_1$ and $k_2$ may be determined to be "1" since the SAD is calculated using a 3×3 mask. Likewise, an SAD between the values of the G signal of the coordinates (i,j) of the current pixel and a B signal of the coordinates (i−2,j−2) that is shifted by two pixels from the coordinates (i,j) is calculated and determined to be the second SAD SAD2. For example, if the second SAD SAD2 is less than the first SAD SAD1, the value of the B signal of the coordinates (i−2,j−2) may be determined to be a pixel value for preventing blurring from occurring in the B channel. Then, an SAD between the values of the B signals of the coordinates (i,j) and the coordinates (i−2,j−2) is calculated and determined to be a third SAD SAD3.

The chrominance signal adjustment unit 183 of FIG. 14 adjusts a U signal of chrominance signals according to a ratio of the first and second SADs SAD1 and SAD2 calculated by the SAD calculation unit 182. In the current embodiment, in order to additionally improve the B channel by processing only the current pixel, a signal of a U channel is adjusted using the ratio of the first and second SADs SAD2 and SAD1 without using the value of the B signal of the coordinates (i−2,j−2). That is, when blurring occurs in the B channel, the difference between the colors of the B signal at the coordinates (i−2,j−2) and the G signal at the coordinates (i,j) is less than the difference between the colors of the B signal and G signal of the coordinates (i,j) and thus, the second SAD SAD2 is less than the first SAD SAD1. Accordingly, the U signal is adjusted again using the ratio of the first and second SADs SAD2 and SAD1. Here, only the U signal is considered since it is greatly affected by the B signal. The U signal may be adjusted as follows:

$$U_o = (SAD2/SAD1) * U \quad (22)$$

Figure 17:
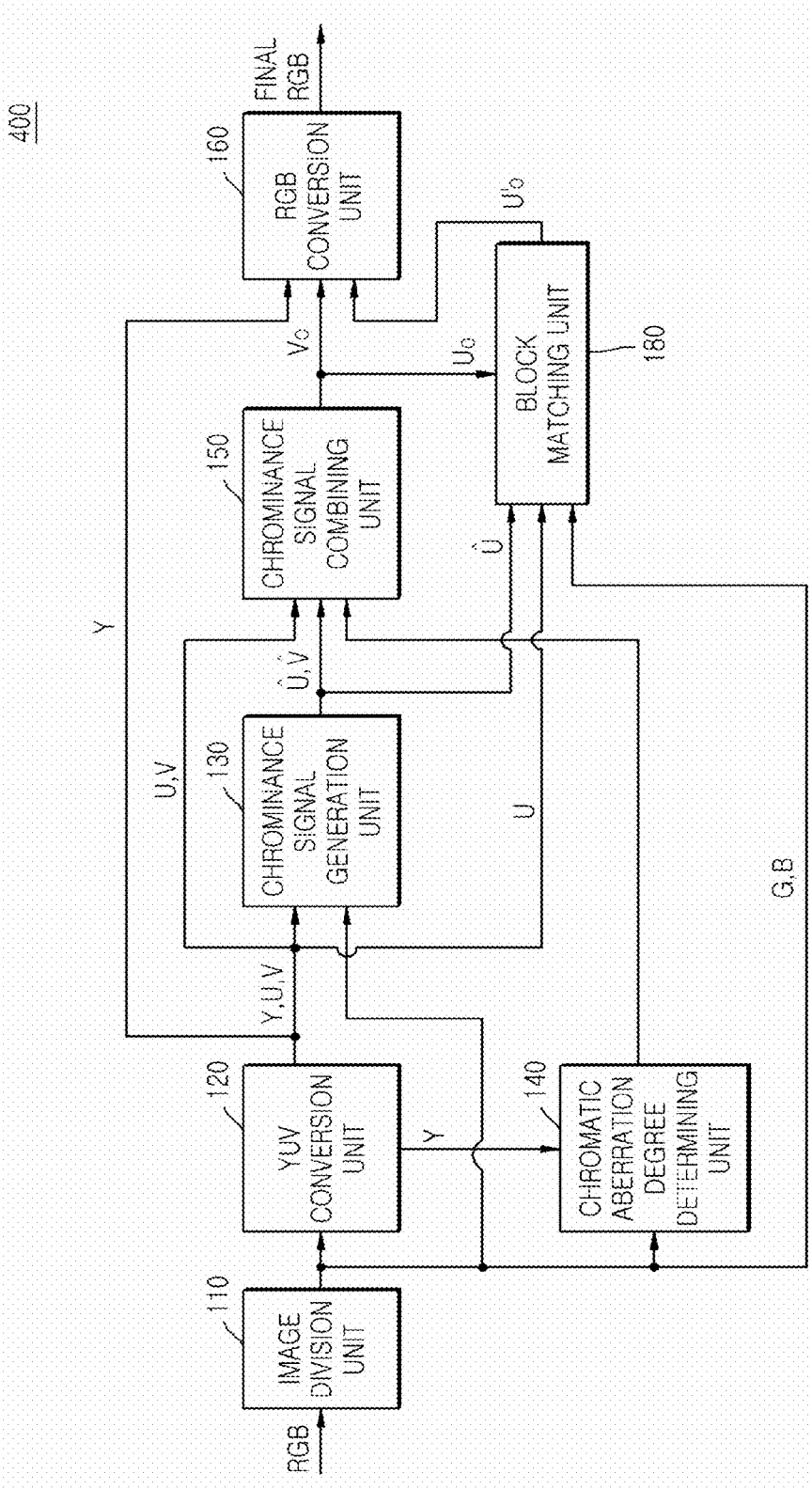
FIG. 17 is a block diagram schematically illustrating an apparatus for canceling chromatic aberration, according to another embodiment of the present invention.

FIG. 17 is a block diagram schematically illustrating an apparatus 400 for canceling chromatic aberration, according to another embodiment of the present invention. Referring to FIG. 17, the apparatus 400 includes an image division unit 110, a YUV conversion unit 120, a chrominance signal generation unit 130, a chromatic aberration degree determining unit 140, a chrominance signal combining unit 150, a block matching unit 180 and an RGB conversion unit 160. Here, descriptions of constitutional elements that are also shown in FIGS. 1 and 2 are not repeated, and the apparatus 400 will now be described focusing on the other elements.

The image division unit 110 divides a received RGB image into a predetermined number of regions in order to perform filtering by changing the filtering range of a mask for correcting chrominance aberration, which is to be applied to the regions, in consideration of the directionality of chromatic aberration occurring. The RGB image may be divided into four quadrants and the filtering range of an asymmetrical mask is changed for the respective four quadrants. Here, the size of the asymmetrical mask is determined according to the directionality of chromatic aberration occurring. The asymmetrical mask has been described above with reference to FIG. 5.

The YUV conversion unit 110 receives RGB signals and converts them into YUV signals.

The chrominance signal generation unit 130 receives the RGB signals, and receives the YUV signals, i.e., luminance and chrominance signals, from the YUV conversion unit 110. The chrominance signal generation unit 130 calculates RGB gradients by using the RGB signals. Also, luminance/chrominance difference are calculated using the luminance and chrominance signals, and the signal generation unit 130 generates chrominance signals for correcting chromatic aberration by filtering the U and V signals while reflecting the RGB gradients and luminance/chrominance difference. In other words, according to the current embodiment, chromatic aberration is cancelled using all the RGB values and the YUV signals converted from the RGB signals. Filtering is actually performed in U and V domains, and chromatic aberration is cancelled in the U and V domains by using a space adaptive weight determined using all the RGB values and YUV values. The chrominance signal generation unit 130 has been described above with reference to FIGS. 1 and 2.

The chromatic aberration degree determining unit 140 determines the degree of chromatic aberration occurring by using a Y signal received from the YUV conversion unit 120. That is, the Y signal is used to measure the degree of chromatic aberration. A luminance component represents the brightness of an image, and chromatic aberration is more visible in a region having a large brightness difference. That is, the degree of chromatic aberration may be measured using contrast information of the Y signal. Thus, in order to measure the degree of chromatic aberration by using the contrast of the image, the locations of local minimum and maximum values of the Y signal are detected in the vertical and horizontal directions, and then the degree of chromatic aberration is determined using the detected maximum and minimum values.

The chrominance signal combining unit 150 combines information regarding the degree of chromatic aberration, which is received from the chromatic aberration degree determining unit 140, a chrominance signal $\hat{C}(i,j)$ for correcting chromatic aberration, which is received from the chrominance signal generation unit 130, and an input chrominance signal C(i,j). Here, the information regarding the degree of chromatic aberration is calculated using a predetermine weight, and the ratio in which the chrominance signal $\hat{C}(i,j)$ and the input chrominance signal C(i,j) are combined is determined according to the weight.

The block matching unit 180 performs block matching on a G signal and a B signal received from the image division unit 110. Here, block matching is performed as described above with reference to FIGS. 15 and 16. That is, candidate pixels for each of the regions of the image are determined based on the characteristics of chromatic aberration occurring, that is, the principle that blue chromatic aberration occurring due to a combination of lateral chromatic aberration and longitudinal chromatic aberration blurs from a central part of an image to a peripheral part thereof. Then the SADs between B signals of blocks including the candidate pixels and G signals of blocks including current pixels that are to be processed are calculated. A method of performing block matching according to the current embodiment is different from a method of performing block matching described above with reference to FIG. 13 in terms of adjustment of a chrominance signal (U signal).

First, $U_t$ may be defined as follows:

$$U_t(U_o/U)*\hat{U} \quad (23),$$

where U denotes a signal received from the YUV conversion unit 120, $U_o$ denotes a chrominance signal received from the chrominance signal combining unit 150, and $\hat{U}$ denotes a chrominance signal received from the chrominance signal generation unit 130.

Next, a $U_o'$ signal is calculated from $U_t$ calculated using Equation (23) and the first through third SADs SAD1, SAD2, and SAD3 calculated using Equation (21), as follows:

$$U_o' = \max\left\{\frac{\max\{SAD2, SAD3\}}{SAD1}, 0.5\right\} \cdot (U_o - U_t) + U_t \quad (24)$$

The $U_o'$ signal calculated using Equation (24) may be used to more effectively reduce chromatic aberration occurring due to a signal of a B channel. Also, it is possible to prevent the original color of the signal of the B channel from degrading by canceling chromatic aberration.

The RGB conversion unit 160 converts a $V_o$ signal received from the chrominance signal combining unit 150, the Y signal received from the YUV conversion unit 120, and the $U_o'$ signal received from the block matching unit 180, into final RGB signals. Accordingly, the final RGB signals are output as an image from which chromatic aberration occurring due to the B channel is cancelled.

FIG. 18 is a flowchart illustrating a method of canceling chromatic aberration, according to another embodiment of the present invention. Referring to FIG. 18, in operation 1800, RGB signals are divided into a predetermined number of regions. In operation 1802, the RGB signals are converted into luminance and chrominance signals YUV. In the current embodiment, YUV color coordinates are used to convert the RGB signals into the signals YUV but the present invention is not limited thereto and other color coordinates may be used. In operation 1804, candidate pixels are determined based on the characteristics of chromatic aberration occurring. That is, different candidate pixels for the regions of the image are determined based on the characteristics of chromatic aberration that the degree of chromatic aberration increases from a center region of the image to a peripheral region thereof. In operation 1806, SADs between blocks including the candidate pixels and blocks including pixels that are to be processed are calculated. In operation 1808, the chrominance signals are controlled according to the ratio of the calculated SADs. In operation 1810, the luminance signal and the controlled chrominance signals are converted into final RGB signals. In operation 1812, the final RGB signals are output as an RGB image from which chromatic aberration is cancelled.

In the current embodiment, each of the apparatuses 100 to 400 for canceling chromatic aberration includes the RGB conversion unit 160 but the present invention is not limited thereto. For example, in general, for compression or detail enhancement (DE) of an image, RGB signals are converted into luminance and chrominance coordinates. After using the luminance and chrominance coordinates, corrected luminance and chrominance signals are output as output signals. Thus, the output luminance and chrominance signals may be directly input to a compression module or a DE module.

In another embodiment of the present invention, the compression module or the DE module may be connected to the end of the apparatuses 100 to 400. Also, in another embodiment of the present invention, in the case of a digital photographing apparatus, for color adjustment, a white balance (WB) device or a color calibration device may be connected to the end of the apparatuses 100 to 400. In another embodiment of the present invention, a noise cancelation device may be connected to the end of the apparatuses 100 to 400 in order to cancel noise, and then, chromatic aberration may be canceled.

According to the above embodiments, only a chrominance signal is filtered from among luminance and chrominance coordinates system by using an asymmetrical mask, based on the characteristics of chromatic aberration occurring. Accordingly, chromatic aberration can be not only cancelled regardless of the characteristics of lens but also the resolution of the original image can be prevented from degrading.

Also, chromatic aberration occurring due to a B channel can be effectively cancelled using block matching.

Also, it is possible to efficiently use a give number of line memories which are hardware to be used to generate a chrominance signal for correcting chromatic aberration in order to cancel chromatic aberration chromatic aberration by aligning the line memories according to the characteristics of chromatic aberration occurring.

The present invention may be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system. Functional programs, code, and code segments used for realizing the present invention may be easily reasoned by a computer programmer in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method of canceling chromatic aberration, the method comprising:
    receiving RGB signals of an image divided into a predetermined number of regions each comprising RGB components, and luminance and chrominance signals converted from the RGB signals;
    matching a block including a candidate pixel with a block including a current pixel that is to be processed for each of the regions of the RGB signals; and
    adjusting the chrominance signals based on a result of matching;
    wherein the block matching is performed based on both pre and post conversion chrominance values.

2. The method of claim 1, wherein the luminance and chrominance signals comprise luminance and chrominance signals of a color space coordinates system selected from the group consisting of YUV, YCbCr, Lab and YCC.

3. A method of canceling chromatic aberration, the method comprising:
    receiving RGB signals divided into a predetermined number of regions, and luminance and chrominance signals converted from the RGB signals;
    matching a block including a candidate pixel with a block including a current pixel that is to be processed for each of the regions of the RGB signals; and
    adjusting the chrominance signals based on a result of matching;
    wherein the performing of block matching comprises:
    determining different candidate pixels for the regions based on characteristics of chromatic aberration occurring; and
    calculating sums of absolute distance (SADs) between B signals of blocks including the determined candidate pixels and G signals of blocks including the corresponding current pixels,
    wherein the adjusting of the chrominance signals comprises adjusting a U signal from among the chrominance signals according to at a ratio of the calculated SADs.

4. The method of claim 3, wherein the calculating of the SADs comprises:
    calculating a first SAD between a B signal of a block including a first candidate pixel and a G signal of the block including the corresponding current pixel; and
    calculating a second SAD between a B signal of a block including a second candidate pixel and the G signal of the block including the corresponding current pixel,
    wherein the adjusting of the chrominance signals comprises adjusting the U signal according to a ratio of the first SAD to the second SAD.

5. The method of claim 4, wherein the first candidate pixel is the current pixel that is to be processed.

6. The method of claim 4, further comprising:
    converting the adjusted U signal and the luminance and chrominance signals into final RGB signals.

7. The method of claim 4, further comprising:
    calculating a third SAD between the B signal of the block including the second candidate pixel and a B signal of the block including the corresponding current pixel, and adjusting the U signal based on the adjusted U signal and the first through third SADs.

8. The method of claim 3, wherein the U signal is a chrominance signal for correcting chromatic aberration, which is obtained by receiving the RGB signals and the luminance and chrominance signals and filtering the chrominance signals while reflecting RGB gradients and luminance/chrominance differences calculated by changing the filtering range of an asymmetrical mask to be applied to the regions of the RGB signals.

9. The method of claim 8, wherein the U signal is a result of combining the chrominance signal for correcting chromatic aberration with the received chrominance signals according to a weight determined based on the degree of chromatic aberration occurring.

10. An apparatus for canceling chromatic aberration, the apparatus comprising:
    a luminance/chrominance conversion unit that receives RGB signals divided into a predetermined number of regions, each comprising RGB components and converts the RGB signals into luminance and chrominance signals; and a block matching unit that matches blocks including candidate pixels of the regions with blocks including current pixels that are to be processed, and adjusts the chrominance signals based on the result of matching;

wherein the block matching is performed based on both pre and post conversion chrominance values.

11. An apparatus for canceling chromatic aberration, the apparatus comprising:

a luminance/chrominance conversion unit that receives RGB signals divided into a predetermined number of regions and converts the RGB signals into luminance and chrominance signals; and a block matching unit that matches blocks including candidate pixels of the regions with blocks including current pixels that are to be processed, and adjusts the chrominance signals based on the result of matching;

wherein the block matching unit comprises:

a candidate pixel determination unit that determines different candidate pixels for the regions of the RGB signals based on a degree of chromatic aberration occurring;

an SAD calculation unit that calculates SADs between B signals of blocks including the candidate pixels and G signals of blocks including the corresponding current pixels; and a chrominance signal adjustment unit that adjusts a U signal from among the chrominance signals according to at a ratio of the calculated SADs.

12. The apparatus of claim 11, wherein:

the SAD calculation calculates a first SAD between a B signal of a block including a first candidate pixel and a G signal of the block including the corresponding current pixel, and a second SAD between a B signal of a block including a second candidate pixel and the G signal of the block including the corresponding current pixel, and the chrominance signal adjustment unit adjusts the U signal according to a ratio of the first SAD to the second SAD.

13. The apparatus of claim 12, further comprising:

an RGB conversion unit that converts the adjusted U signal and the luminance and chrominance signals into final RGB signals.

14. The apparatus of claim 11, wherein:

the SAD calculation unit calculates a third SAD between the B signal of the block including the second candidate pixel and a B signal of the block including the corresponding current pixel, and the chrominance signal adjustment unit adjusts the U signal based on the adjusted U signal and the first through third SADs.

15. The apparatus of claim 11, further comprising:

a chrominance signal generation unit that receives the RGB signals and the luminance and chrominance signals, and generates the U signal by filtering the chrominance signals while reflecting RGB gradients and luminance/chrominance differences calculated by changing the filtering range of an asymmetrical mask to the regions of the RGB signals, where the U signal is a chrominance signal for correcting chromatic aberration.

16. The apparatus of claim 15, wherein the U signal is a result of combining the chrominance signal for correcting chromatic aberration with the received chrominance signals according to a weight determined based on a degree of chromatic aberration occurring.

17. The apparatus of claim 15, wherein the filtering range of the asymmetrical mask is determined according to directionality of chromatic aberration occurring.

* * * * *